(12) United States Patent
Chen et al.

(10) Patent No.: US 8,948,241 B2
(45) Date of Patent: Feb. 3, 2015

(54) SIGNALING CHARACTERISTICS OF AN MVC OPERATION POINT

(75) Inventors: Ying Chen, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 12/757,231

(22) Filed: Apr. 9, 2010

(65) Prior Publication Data

US 2011/0032999 A1    Feb. 10, 2011

Related U.S. Application Data

(60) Provisional application No. 61/232,272, filed on Aug. 7, 2009, provisional application No. 61/248,738, filed on Oct. 5, 2009, provisional application No. 61/266,861, filed on Dec. 4, 2009.

(51) Int. Cl.
*H04N 21/43* (2011.01)
*H04N 21/63* (2011.01)
(Continued)

(52) U.S. Cl.
CPC ..... *H04N 21/435* (2013.01); *H04N 21/234327* (2013.01); *H04N 21/235* (2013.01);
(Continued)

(58) Field of Classification Search
USPC ............ 375/240.01–240.26, E7.011, E7.213, 375/E7.25, E7.256, E7.262; 348/385.1
See application file for complete search history.

(56) References Cited

U.S. PATENT DOCUMENTS 6,748,020 B1 * 6/2004 Eifrig et al. .............. 375/240.26
7,136,415 B2 * 11/2006 Yun et al. ................. 375/240.26
(Continued)

FOREIGN PATENT DOCUMENTS

EP    0308826 B1    2/1996
EP    0810599 B1    11/2003
(Continued)

OTHER PUBLICATIONS

Joint Video Draft 8.0 on Multiview Video Coding of Joint Video Team (JVT) of ISO/IEC MPEG & ITU-T VCEG (ISO/IEC JTC1/SC29/WG11 and ITU-T SG16 Q.6), 28th Meeting, Hanover, Germany, Jul. 20-26, 2008, pp. 1-63.*
(Continued)

*Primary Examiner* — Jay Patel
*Assistant Examiner* — Reza Aghevli
(74) *Attorney, Agent, or Firm* — Steven Thiel; John Rickenbrode

(57) ABSTRACT

Source and destination video devices may use data structures that signal details of an operation point for an MPEG-2 (Motion Picture Experts Group) System bitstream. In one example, an apparatus includes a multiplexer that constructs a data structure corresponding to a multiview video coding (MVC) operation point of an MPEG-2 (Motion Picture Experts Group) System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, and that includes the data structure as part of the bitstream, and an output interface that outputs the bitstream comprising the data structure.

40 Claims, 8 Drawing Sheets

(51) Int. Cl.
| | |
|---|---|
| H04N 21/435 | (2011.01) |
| H04N 21/2343 | (2011.01) |
| H04N 21/235 | (2011.01) |
| H04N 21/236 | (2011.01) |
| H04N 21/2362 | (2011.01) |
| H04N 21/2365 | (2011.01) |
| H04N 21/434 | (2011.01) |
| H04N 21/6336 | (2011.01) |
| H04N 21/845 | (2011.01) |

(52) U.S. Cl.
CPC ......... *H04N21/236* (2013.01); *H04N 21/2362* (2013.01); *H04N 21/2365* (2013.01); *H04N 21/4347* (2013.01); *H04N 21/6336* (2013.01); *H04N 21/8451* (2013.01)
USPC .......................................................... 375/240

(56) References Cited

U.S. PATENT DOCUMENTS

| | | | |
|---|---|---|---|
| 7,324,594 B2* | 1/2008 | Lamboray et al. ....... | 375/240.03 |
| 2005/0254575 A1 | 11/2005 | Hannuksela et al. | |
| 2005/0254755 A1* | 11/2005 | Sun ................................. | 385/54 |
| 2007/0177812 A1 | 8/2007 | Yang | |
| 2008/0089428 A1* | 4/2008 | Nakamura et al. ....... | 375/240.26 |
| 2008/0095234 A1* | 4/2008 | Wang et al. .............. | 375/240.13 |
| 2008/0117985 A1* | 5/2008 | Chen et al. ............... | 375/240.26 |
| 2008/0130738 A1* | 6/2008 | Lee et al. .................. | 375/240.01 |
| 2008/0137742 A1* | 6/2008 | Chen et al. ............... | 375/240.13 |
| 2008/0170618 A1* | 7/2008 | Choi et al. ............... | 375/240.16 |
| 2008/0175325 A1* | 7/2008 | Hannuksela et al. .... | 375/240.26 |
| 2009/0147860 A1* | 6/2009 | Pandit et al. ............. | 375/240.26 |
| 2009/0225826 A1 | 9/2009 | Pandit et al. | |

FOREIGN PATENT DOCUMENTS

| | | |
|---|---|---|
| RU | 2298235 C2 | 4/2007 |
| RU | 2328086 C2 | 6/2008 |
| WO | 2004036580 A1 | 4/2004 |
| WO | 2008085885 A2 | 7/2008 |
| WO | 2008130528 A2 | 10/2008 |
| WO | WO2009048502 | 4/2009 |

OTHER PUBLICATIONS

Chen et al, "The Emerging MVC Standard for 3D Video Services", originally published on Mar. 25, 2008 and again in EURASIP Journal on Advances in Signal Processing, Aug. 1, 2009, Article ID 78015, pp. 1-14.*
Ho et al, "Overview of Multi-view Video Coding", Int'l Conf. on Systems, Signals and Image Processing 2007 (IWSSIP 2007), Jun. 27-30, 2007, Slovenia, pp. 9-16.*
Haskell et al, Digital Video, An Introduction to MPEG-2, Chapman and Hall, ISBN: 0-412-08411-2, pp. 44-47.*
Merkle et al, "Efficient Prediction Structures for Multiview Video Coding", IEEE Trans. on Circuits and Systems for Video Technology, vol. 17, No. 11, Nov. 2007, pp. 1461-1473.*
Guillemot, et al, "Distributed Monoview and Multiview Video Coding", IEEE Signal Processing Magazine, Sep. 2007, pp. 67-76.*
Yamamoto, et al, "Multiview Video Coding Using View Interpolation and Color Correction", IEEE Trans. on Circuits and Systems for Video Technology, vol. 17, No. 11, Nov. 2007, pp. 1436-1449.*
Merkel et al, "Multi-view Video plus Depth Representation and Coding", Int'l Conf. on Image Processing 2007 (ICIP 2007), Sep. 16, 2007-Oct. 19, 2007, vol. I, pp. I-201-I-204.*
Ho et al, "Overview of Multi-view Video Coding", Int'l Conf. on Systems, Signals and Image Processing 2007 (IWSSIP 2007), Jun. 27-30, 2007.*
Vetro et al, "Overview of the Stereo and Multiview Video Coding Extensions of the H.264/MPEG-4 AVC Standard", Proc. Of IEEE, vol. 99, No. 4, Apr. 2011, pp. 626-641.*

Joint Video Draft 8.0 on Multiview Video Coding of Joint Video Team (JVT) of ISO/IEC MPEG and ITU-T Video Coding Expert Group (VCEG)—ISO/IEC JTC/SC29/WG11 and ITU-T SG16 Q.6, 28th Meeting, Hanover, Germany, Jul. 20-26, 2008.*
Haskell et al, Digital Video: An Introduction to MPEG-2, Chapman and Hall, pp. 44-47.*
Chen et al, "The Emerging MVC Standard for 3D Video Services", EURASIP Journal of Advanced Signal Processing, vol. 2009, originally published on Mar. 25, 2008, pp. 1-13.*
Chen et al, WIPO Publication: WO/2011/017661, Feb. 10, 2011.*
International Standard ISO/IEC 13818-1:2000(E), "Information Technology—Generic Coding of Moving Pictures and Associated Audio Information: Systems," Second edition. Dec. 1, 2000, pp. 1-174.
Article titled "Text of ISO/IEC 13818-1:2007/FPDAM 4—Transport of Muitiview Video over ITU-T Rec H.222.0 | ISO/IEC 13818-1," International Organization for Standardization Organisation Internationale De Normalisation ISO/IEC JTC1/SC29/WG11 Coding of Moving Pictures and Audio, ISO/IEC JTC1/SC29/WG11 MPEG2009/10436, Lausanne, Switzerland, 2009, pp. 1-21.
Lim et al., "A Multiview Sequence CODEC with View Scalability," Signal Processing: Image Communication 19 (2004) pp. 239-256.
Sullivan et al., Document: JVT-AA007, "Editors' Draft Revision to ITU-T Rec. H.264 | ISO/IEC 14496-10 Advanced Video Coding—In Preparation for ITU-T SG 16 AAP Consent (in Integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Vetro et al., Document: JVT-AB204 (rev. 1), "Joint Draft 8.0 on Multiview Video Coding," Joint Video Team (JVT) of ISO/IEC MPEG & ITU-T VCEG(ISO/IEC JTC1/SC29/WG11 and ITU-T SG16 Q.6), 28th Meeting: Hannover, DE, Jul. 20-25, 2008, pp. 1-66, http://wftp3.itu.int/av-arch/jvt-site/2008_07_Hannover/JVT-AB204.zip.
Advanced video coding for generic audiovisual services; H.264 (Mar. 2009) ITU-T Standard, International Telecommunication Union, Geneva ; CH, No. H.264 (Mar. 2009), Mar. 16, 2009, XP017433935 Annex A Annex H.
Chen Y, Chen P, Karczewicz M: "Comments on the carriage of MVC over MPEG-2 Systems" ISO/IEC JTC1/SC29/WG11/MG2009, vol . MPEG2009, No. 17025, Oct. 23, 2009, XP002605068 the whole document.
Cheng Y, Karczewicz M, Chen P: "Comments on FDAM4 of MPEG-2 Systems: Transport of MVC" ISO/IEC JTC1/SC29/WG11/MG2009, vol. MPEG2009, No. 16732, Jun. 25, 2009, XP002605069 the whole document.
International Search Report and Written Opinion—PCT/US2010/044780, International Search Authority—European Patent Office—Nov. 8, 2010.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T Rec. H.222.0(May 2006)FPDAM 4, vol. MPEG2009, No. 10572, May 11, 2009, pp. 1-20, XP002605067 p. 11, last two paragraphs sections 2.6.78 and 2.6.79 table T-1.
Text of ISO/IEC 13818-1:200X (3rd edition) ITU Study Group 16—Video Coding Experts Group—ISO/IEC MPEG & ITU-T VCEG(ISO/IEC JTC1/SC29/WG11 and ITU-T SG16 Q6), XX, XX, No. N7904, Mar. 29, 2006, XP030014396 section "Summary".
Chiariglione, L., "Report of 89th meeting", ISO/IEC JTC 1/SC 29/WG 11 Coding of Moving Pictures and Audio, ISO/IEC JTC 1/SC 29/WG 11 N10698, London, Jul. 2009, pp. 1-145.
Sullivan, G., et al., "Meeting Report of the 31st JVT Meeting", Joint Video Team (JVT) of ISO/IEC MPEG & ITU-T VCEG, JVT-AE200, 31st Meeting: London, Jun. 28-Jul. 2, 2009, p. 22.
Chen Y., et al., "Information on M16732: comments on MPEG-2 systems design for MVC", Joint Video Team (JVT) of ISO/IEC MPEG & ITU-T VCEG (ISO/IEC JTC1/SC29/WG11 and ITU-T SG16 Q.6) 31st Meeting: London, UK, Jun. 28-Jul. 3, 2009, [JVT-AE026], <JVT-AE026.doc>, <JVT-AE026_m16732.pdf>.
Taiwan Search Report—TW099126516—TIPO—Jul. 16, 2013.

* cited by examiner

SIGNALING CHARACTERISTICS OF AN MVC OPERATION POINT

This application claims the benefit of U.S. Provisional Application Nos. 61/232,272, filed Aug. 7, 2009, 61/248,738, filed Oct. 5, 2009, and 61/266,861, filed Dec. 4, 2009, the entire contents of each of which are hereby incorporated by reference in their respective entireties.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized by a multiplexer for transmission or storage. MPEG-2 includes a "Systems" section that defines a transport level for many video encoding standards. MPEG-2 transport level systems may be used by MPEG-2 video encoders, or other video encoders conforming to different video encoding standards. For example, MPEG-4 prescribes different encoding and decoding methodologies than those of MPEG-2, but video encoders implementing the techniques of the MPEG-4 standard may still utilize the MPEG-2 transport level methodologies.

In general, references to "MPEG-2 systems" in this disclosure, refer to the transport level of video data prescribed by MPEG-2. The transport level prescribed by MPEG-2 is also referred to in this disclosure as an "MPEG-2 transport stream" or simply a "transport stream." Likewise, the transport level of MPEG-2 systems also includes program streams. Transport streams and program streams generally include different formats for delivering similar data, where a transport stream comprises one or more "programs" including both audio and video data, while program streams include one program including both audio and video data.

Efforts have been made to develop new video coding standards based on H.264/AVC. One such standard is the scalable video coding (SVC) standard, which is the scalable extension to H.264/AVC. Another standard is the multi-view video coding (MVC), which becomes the multiview extension to H.264/AVC. The MPEG-2 Systems specification describes how compressed multimedia (video and audio) data streams may be multiplexed together with other data to form a single data stream suitable for digital transmission or storage. The latest specification of MPEG-2 systems is specified in "Information Technology—Generic Coding of Moving Pictures and Associated Audio: Systems, Recommendation H.222.0; International Organisation for Standardisation, ISO/IEC JTC1/SC29/WG11; Coding of Moving Pictures and Associated Audio," May 2006. MPEG recently designed the transport standard of MVC over MPEG-2 systems and the latest version of this specification is "Study of ISO/IEC 13818-1: 2007/FPDAM4 Transport of MVC", *MPEG doc. N10572, MPEG of ISO/IEC JTC1/SC29/WG*11, Maui, Hi., USA, April 2009.

SUMMARY

In general, this disclosure describes techniques for improving multiview video coding in MPEG-2 (Motion Picture Experts Group) systems. In particular, the techniques of this disclosure are directed to a data structure for an operation point of an MPEG-2 System bitstream, where the data structure signals a rendering capability for a receiving device, a decoding capability for the receiving device, and in some examples, a bitrate for the operation point. The data structure may correspond to an operation point descriptor that is included in the MPEG-2 System bitstream.

In order to properly decode and display video data of an operation point, a receiving device should satisfy the properties described by the rendering capability and decoding capability signaled in the data structure. MPEG-2 Systems bitstreams may include a plurality of operation points that correspond to various views of a program. Using different operation points for a program allows various client devices to perform adaptation. That is, client devices with different rendering and decoding capabilities can extract views from the same program to display two-dimensional or three-dimensional video data. The client devices may also negotiate with a server device to retrieve data of varying bitrates to adapt to transportation media of various bandwidth capabilities.

In one example, a method includes constructing, with a source device, a data structure corresponding to a multiview video coding (MVC) operation point of an MPEG-2 System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, and wherein the data structure is included as part of the bitstream, and outputting the bitstream comprising the data structure.

In another example, an apparatus includes a multiplexer that constructs a data structure corresponding to an MVC operation point of an MPEG-2 System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, and that includes the data structure as part of the bitstream, and an output interface that outputs the bitstream comprising the data structure.

In another example, an apparatus includes means for constructing a data structure corresponding to a MVC operation point of an MPEG-2 System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, and wherein the data structure is included as part of the bitstream, and means for outputting the bitstream comprising the data structure.

In another example, a computer-readable storage medium comprises instructions that cause a processor of a source device to construct a data structure corresponding to a MVC operation point of an MPEG-2 System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, and wherein the data structure is included as part of the bitstream, and cause an output interface to output the bitstream comprising the data structure.

In another example, a method includes receiving, with a destination device, a data structure corresponding to an MVC operation point of an MPEG-2 (Motion Picture Experts Group) System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, determining whether a video decoder of the destination device is capable of decoding views corresponding to the MVC operation point based on the decoding capability signaled by the data structure, determining whether the destination device is capable of rendering the views corresponding to the MVC operation point based on the rendering capability signaled by the data structure, and sending the views corresponding to the MVC operation point to the video decoder of the destination device when the video decoder of the destination device is determined to be capable of decoding and rendering the views corresponding to the MVC operation point.

In another example, an apparatus includes an input interface configured to receive a data structure corresponding to an MVC operation point of an MPEG-2 System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, a video decoder configured to decode video data; and a demultiplexer configured to determine whether the video decoder is capable of decoding views corresponding to the MVC operation point based on the decoding capability signaled by the data structure, to determine whether the apparatus is capable of rendering the views corresponding to the MVC operation point based on the rendering capability signaled by the data structure, and to send the views corresponding to the MVC operation point to the video decoder when the video decoder is determined to be capable of decoding and rendering the views corresponding to the MVC operation point.

In another example, an apparatus includes means for receiving a data structure corresponding to an MVC operation point of an MPEG-2 System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, means for determining whether a video decoder of the apparatus is capable of decoding views corresponding to the MVC operation point based on the decoding capability signaled by the data structure, means for determining whether the apparatus is capable of rendering the views corresponding to the MVC operation point based on the rendering capability signaled by the data structure, and means for sending the views corresponding to the MVC operation point to the video decoder of the apparatus when the video decoder of the apparatus is determined to be capable of decoding and rendering the views corresponding to the MVC operation point.

In another example, a computer-readable storage medium comprises instructions that cause a processor of a destination device to receive a data structure corresponding to a MVC operation point of an MPEG-2 System standard bitstream, wherein the data structure signals a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point, determine whether a video decoder of the destination device is capable of decoding views corresponding to the MVC operation point based on the decoding capability signaled by the data structure, determine whether the destination device is capable of rendering the views corresponding to the MVC operation point based on the rendering capability signaled by the data structure, and send the views corresponding to the MVC operation point to the video decoder of the destination device when the video decoder of the destination device is determined to be capable of decoding and rendering the views corresponding to the MVC operation point.

The details of one or more examples are set forth in the accompanying drawings and the description below. Other features, objects, and advantages will be apparent from the description and drawings, and from the claims.

DETAILED DESCRIPTION

Figure 1:
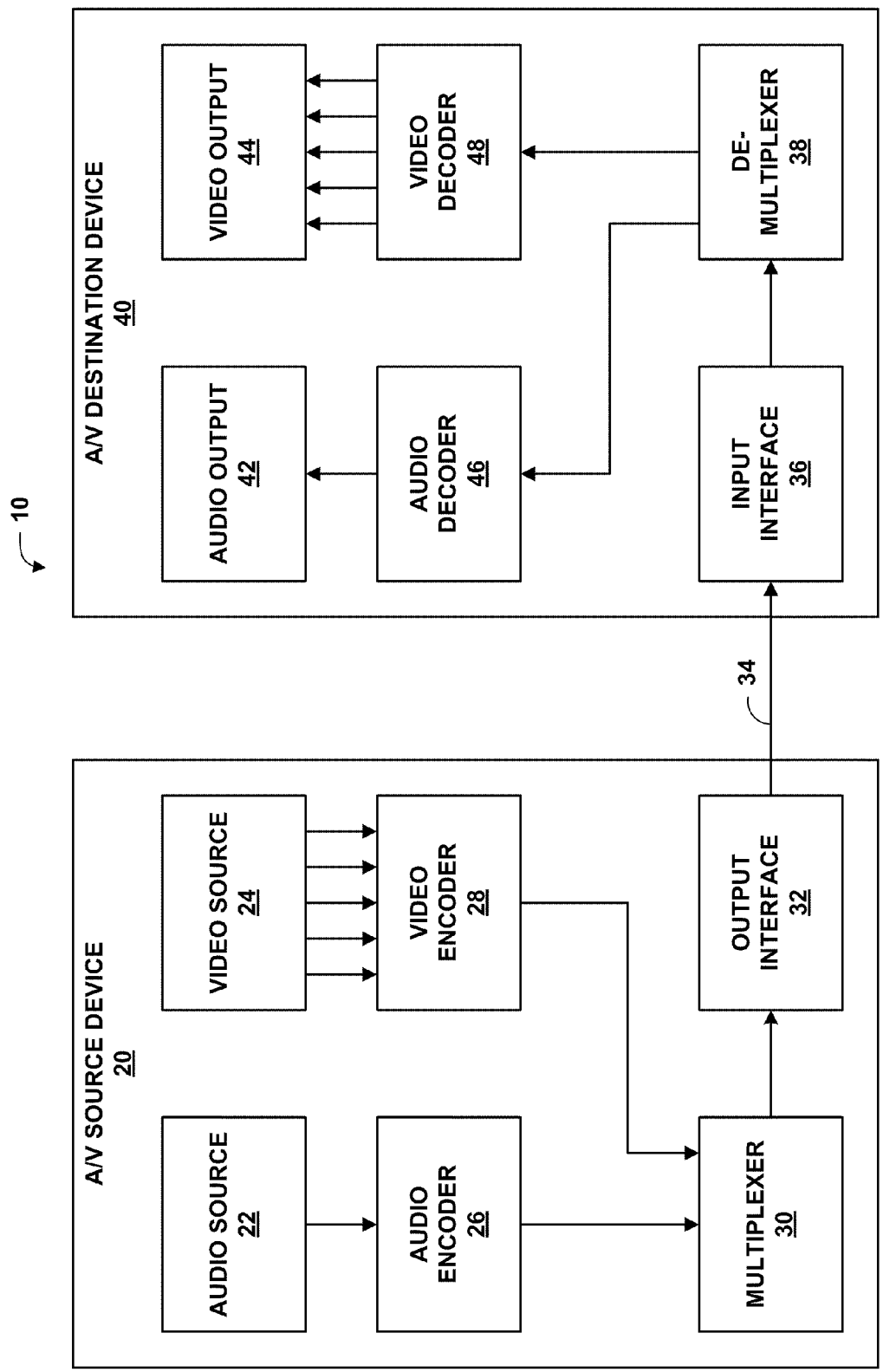
FIG. 1 is a block diagram illustrating an example system consistent with this disclosure in which an audio/video (A/V) source device transports audio and video data to an A/V destination device.

The techniques of this disclosure are generally directed to enhancing Multiview Video Coding (MVC) in MPEG-2 (Motion Picture Experts Group) systems, that is, systems that conform to MPEG-2 with respect to transport level details. MPEG-4, for example, provides standards for video encoding, but generally assumes that video encoders conforming to the MPEG-4 standard will utilize MPEG-2 transport level systems. Accordingly, the techniques of this disclosure are applicable to video encoders that conform to MPEG-2, MPEG-4, ITU-T H.263, ITU-T H.264/MPEG-4, or any other video encoding standard that utilizes MPEG-2 transport streams and/or program streams (also spelled "programme streams").

In particular, the techniques of this disclosure may modify syntax elements at the transport level for MPEG-2 transport streams and program streams. For example, the techniques of this disclosure include a descriptor that is transmitted in the transport stream to describe features of an operation point. A server device, for example, may provide various operation points in an MPEG-2 transport layer bitstream, each of which corresponds to a respective subset of particular views of multiview video coding video data. That is, an operation point generally corresponds to a subset of views of a bitstream. In some examples, each view of an operation point includes video data at the same frame rate.

A destination device may use operation point descriptors included in a bitstream to select one of the operation points to be decoded and ultimately presented (e.g., displayed) to a user. Rather than passing data for all of the views to a video decoder upon receipt, the destination device may send only the views of a selected operation point to the video decoder. In this manner, the destination device may discard data for views that will not be decoded. The destination device may select an operation point based on the highest quality supported one of the operation points for a bitstream.

The server device may send a plurality of sub-bitstreams (each of which may correspond to an operation point) in a single transport stream or program stream. Although in various sections this disclosure may refer individually to a "transport stream" or a "program stream," it should be understood that the techniques of this disclosure are generally applicable to either or both of MPEG-2 transport streams and program streams. In general, this disclosure describes the use of descriptors as example data structures for performing the techniques of this disclosure. Descriptors are used to extend the functionality of a stream. The descriptors of this disclosure may be used both by transport streams and program streams to implement the techniques of this disclosure. Although this disclosure primarily focuses on descriptors as an example data structure that may be used to signal a rendering capability value for an operation point, a decoding capability value for the operation point, and a bitrate value for the operation point, it should be understood that other data structures may also be used to perform these techniques.

In accordance with the techniques of this disclosure, source device 20 may construct an operation point descriptor that describes characteristics of an operation point. The characteristics may include, for example, which views are included in an operation point and frame rates for the views of the operation point. The operation point descriptor may specify a rendering capability that should be supported by a video decoder in order to receive and decode the operation point, a decoding capability that should be supported by the video decoder in order to receive and decode the operation point, and a bitrate for the operation point.

The techniques of this disclosure may generally represent each operation point as if the operation point were its own program, signaled by a program map table in a transport stream or a program stream map in a program stream. Alternatively, when a program contains multiple operation points, the techniques of this disclosure provide information on how the operation points are to be reassembled in operation point descriptors. The operation point descriptors may further signal dependencies of operation points, which may save bits.

FIG. 1 is a block diagram illustrating an example system 10 consistent with this disclosure in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the transport of encoded multimedia (e.g., audio and video) data, and reception and subsequent interpretation and decoding of the transported multimedia data. The techniques of this disclosure are particularly applicable to transport of Multiview Video Coding (MVC) data, that is, video data comprising a plurality of views. As shown in the example of FIG. 1, video source 24 may provide a plurality of views of a scene to video encoder 28. MVC may be useful for generating three-dimensional video data to be used by a three-dimensional display, such as a stereoscopic or autostereoscopic three-dimensional display.

A/V source device 20 may provide a "service" to A/V destination device 40. A service generally corresponds to a subset of available views of MVC data. For example, MVC data may be available for eight views, ordered zero through seven. One service may correspond to stereo video having two views, while another service may correspond to four views, and still another service may correspond to all eight views. In general, a service corresponds to any combination (that is, any subset) of the available views. A service may also correspond to a combination of available views as well as audio data. An operation point may correspond to a service, such that A/V source device 20 may further provide an operation point descriptor for each service provided by A/V source device 20.

A/V source device 20, in accordance with the techniques of this disclosure, is able to provide services that correspond to a subset of views. In general, a view is represented by a view identifier, also referred to as a "view_id." View identifiers generally comprise syntax elements that may be used to identify a view. An MVC encoder provides the view_id of a view when the view is encoded. The view_id may be used by an MVC decoder for inter-view prediction or by other units for other purposes, e.g., for rendering.

Figure 7:
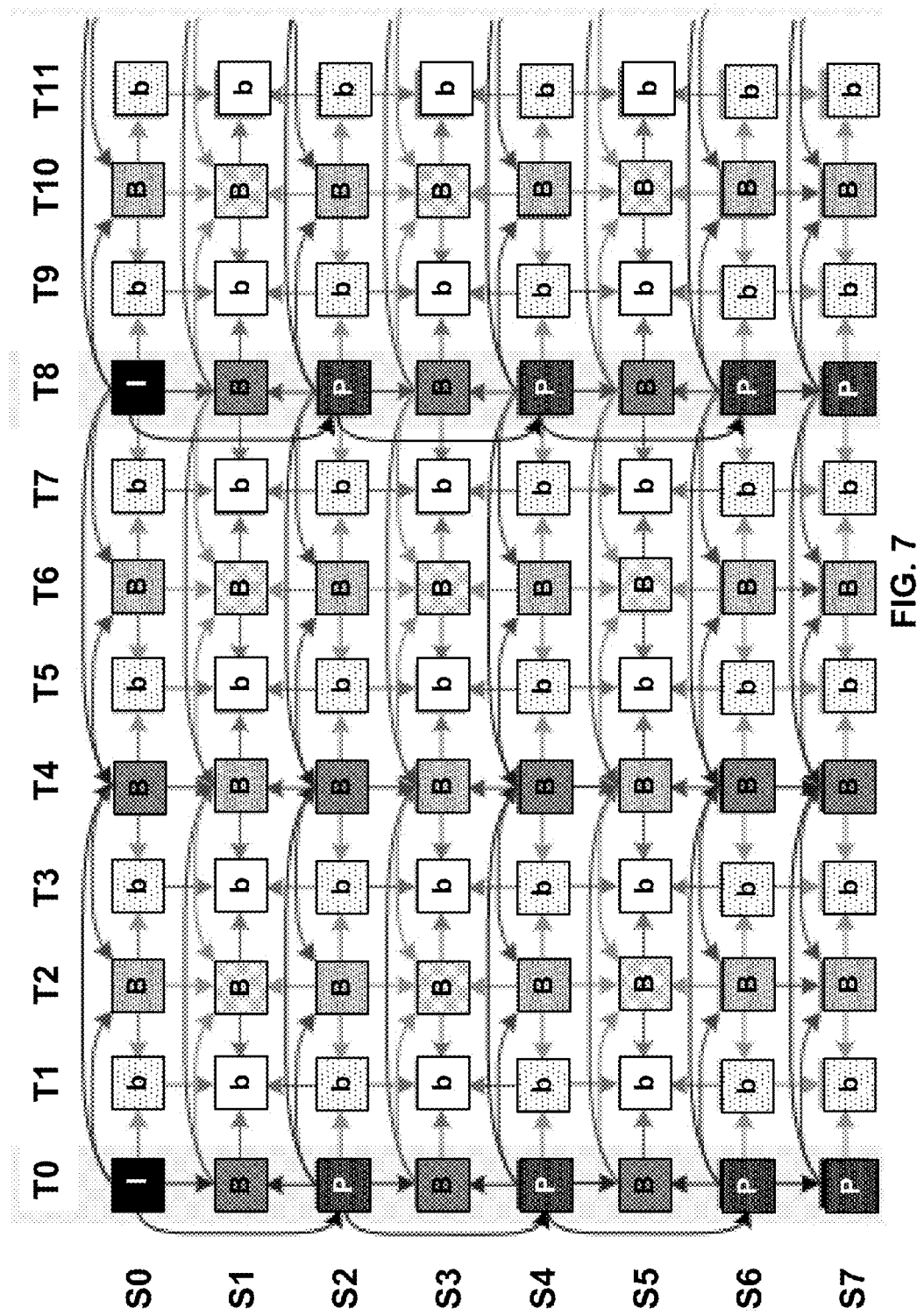
FIG. 7 is a conceptual diagram illustrating an example MVC prediction pattern.

Inter-view prediction is a technique for encoding MVC video data of a frame with reference to one or more frames at a common temporal location as the encoded frame of different views. FIG. 7, which is discussed in greater detail below, provides an example coding scheme for inter-view prediction. In general, an encoded frame of MVC video data may be predictively encoded spatially, temporally, and/or with reference to frames of other views at a common temporal location. Accordingly, reference views, from which other views are predicted, generally are decoded before the views for which the reference views act as reference, so that these decoded views can be used for reference when decoding referential views. The decoding order does not necessarily correspond to the order of the view_ids. Therefore, the decoding order of views is described using view order indexes. View order indexes are indexes that indicate the decoding order of corresponding view components in an access unit.

Each individual stream of data (whether audio or video) is referred to as an elementary stream. An elementary stream is a single, digitally coded (possibly compressed) component of a program. For example, the coded video or audio part of the program can be an elementary stream. An elementary stream may be converted into a packetized elementary stream (PES) before multiplexed into a program stream or transport stream. Within the same program, a stream ID is used to distinguish the PES-packets belonging to one elementary stream from the other. The basic unit of data of an elementary stream is a packetized elementary stream (PES) packet. Thus, each view of MVC video data corresponds to respective elementary streams. Similarly, audio data corresponds to one or more respective elementary streams.

An MVC coded video sequence may be separated into several sub-bitstreams, each of which is an elementary stream. Each sub-bitstream may be identified using an MVC view_id subset. Based on the concept of each MVC view_id subset, an MVC video sub-bitstream is defined. An MVC video sub-bitstream contains the NAL units of the views listed in the MVC view_id subset. A program stream generally contains only the NAL units which are from those of the elementary streams. It is also designed that any two elementary streams cannot contain an identical view.

In the example of FIG. 1, multiplexer 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, multiplexer 30 may include packetizers for forming PES packets from encoded audio and video data.

A "program," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Multiplexer 30 is responsible for assembling elementary streams into constituent program streams or transport streams. A program stream and a transport stream are two alternative multiplexes targeting different applications.

In general, a program stream includes data for one program, while a transport stream may include data for one or more programs. Multiplexer 30 may encode either or both of a program stream or a transport stream, based on a service being provided, a medium into which the stream will be passed, a number of programs to be sent, or other considerations. For example, when the video data is to be encoded in a storage medium, multiplexer 30 may be more likely to form a program stream, whereas when the video data is to be streamed over a network, broadcast, or sent as part of video telephony, multiplexer 30 may be more likely to use a transport stream.

Multiplexer 30 may be biased in favor of using a program stream for the storage and display of a single program from a digital storage service. A program stream is intended for use in error-free environments or environments less susceptible to encountering errors, because program streams are rather susceptible to errors. A program stream simply comprises the elementary streams belonging to it and usually contains packets of variable lengths. In a program stream, PES-packets that are derived from the contributing elementary streams are organized into "packs." A pack comprises a pack-header, an optional system-header, and any number of PES-packets taken from any of the contributing elementary streams, in any order. The system header contains a summary of the characteristics of the program stream such as its maximum data rate, the number of contributing video and audio elementary streams, further timing information, or other information. A decoder may use the information contained in a system header to determine whether or not the decoder is capable of decoding the program stream.

Multiplexer 30 may use a transport stream for the simultaneous delivery of a plurality of programs over potentially error-prone channels. A transport stream is a multiplex devised for multi-program applications such as broadcasting, so that a single transport stream can accommodate many independent programs. A transport stream may comprise a succession of transport packets, with each of the transport packets being 188-bytes long. The use of short, fixed length packets causes the transport stream to be less susceptible to errors than the program stream. Further, each 188-byte-long transport packet may be given additional error protection by processing the packet through a standard error protection process, such as Reed-Solomon encoding. The improved error resilience of the transport stream means that it has a better chance of surviving the error-prone channels to be found in a broadcast environment, for example.

It might seem that the transport stream is better than a program stream due to its increased error resilience and ability to carry many simultaneous programs. However, the transport stream is a more sophisticated multiplex than the program stream and is consequently more difficult to create and more complicated to demultiplex than a program stream. The first byte of a transport packet may be a synchronization byte having a value of 0x47 (hexadecimal 47, binary '01000111,' decimal 71). A single transport stream may carry many different programs, each program comprising many packetized elementary streams. Multiplexer 30 may use a thirteen-bit Packet Identifier (PID) field to distinguish transport packets containing the data of one elementary stream from those carrying the data of other elementary streams. It is the responsibility of the multiplexer to ensure that each elementary stream is awarded a unique PID value. The last byte of a transport packet may be the continuity count field. Multiplexer 30 increments the value of the continuity count field between successive transport packets belonging to the same elementary stream. This enables a decoder or other unit of a destination device, such as A/V destination device 40, to detect the loss or gain of a transport packet and hopefully conceal the errors that might otherwise result from such an event.

Multiplexer 30 receives PES packets for elementary streams of a program from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units contain the core compression engine and may comprise block, macroblock, and/or slice levels. Other NAL units are non-VCL NAL units.

Multiplexer 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

The priority_id element of an NAL header may be used for a simple one-path bitstream adaptation process. The temporal_id element may be used for specifying the temporal level of the corresponding NAL unit, where different temporal levels correspond to different frame rates.

The anchor_pic_flag element may indicate whether a picture is an anchor picture or non-anchor picture. Anchor pictures and all the pictures succeeding it in the output order (that is, the display order) can be correctly decoded without decoding of previous pictures in the decoding order (that is, the bitstream order), and thus, can be used as random access points. Anchor pictures and non-anchor pictures can have different dependencies, both of which are signaled in the sequence parameter set. Other flags are to be discussed and used in the following sections of this chapter. Such an anchor picture may also be referred to as an open GOP (Group Of Pictures) access point, while a close GOP access point is also supported when the non_idr_flag element is equal to zero. The non_idr_flag element indicates whether a picture is an instantaneous decoder refresh (IDR) or view IDR (V-IDR) picture. In general, an IDR picture, and all the pictures succeeding it in output order or bitstream order, can be correctly decoded without decoding of previous pictures in either decoding order or display order.

The view_id element may comprise syntax information that may be used to identify a view, which may be used for data interactivity inside an MVC decoder, e.g., for inter-view prediction, and outside a decoder, e.g., for rendering. The inter_view_flag element may specify whether the corresponding NAL unit is used by other views for inter-view prediction. To convey the 4-byte NAL unit header information for a base view, which may be compliant to AVC, a prefix NAL unit is defined in MVC. In the context of MVC, the base view access unit includes the VCL NAL units of the current time instance of the view as well as its prefix NAL unit, which contains only the NAL unit head. An H.264/AVC decoder may ignore the prefix NAL unit.

A NAL unit including video data in its payload may comprise various granularity levels of video data. For example, a NAL unit may comprise a block of video data, a macroblock, a plurality of macroblocks, a slice of video data, or an entire frame of video data. Multiplexer 30 may receive encoded video data from video encoder 28 in the form of PES packets of elementary streams. Multiplexer 30 may associate each elementary stream with a corresponding program by mapping stream_ids to corresponding programs, e.g., in a database or other data structure, such as a Program Map Table (PMT) or Program Stream Map (PSM).

Multiplexer 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific frames for all views of the same access unit (the same time instance) may be rendered simultaneously. In an example corresponding to H.264/AVC, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

Multiplexer 30 may also embed data regarding a program in a NAL unit. For example, multiplexer 30 may create a NAL unit comprising a Program Map Table (PMT) or a Program Stream Map (PSM). In general, a PMT is used to describe a transport stream, while a PSM is used to describe a program stream. As described in greater detail with respect to the example of FIG. 2 below, multiplexer 30 may comprise or interact with a data storage unit that associates elementary streams received from audio encoder 26 and video encoder 28 with programs and accordingly with respective transport streams and/or program streams.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

The MPEG-2 Systems standard allows for extensions of the system by way of "descriptors." Both PMTs and PSMs include descriptor loops in which one or more descriptors may be inserted. In general, a descriptor may comprise a data structure that may be used to extend the definition of programs and/or program elements. This disclosure describes an operation point descriptors for performing the techniques of this disclosure. In general, the operation point descriptor of this disclosure enhances the conventional MVC extension descriptor by describing a rendering capability, a decoding capability, and a bitrate for an operation point. A destination device, such as A/V destination device 40, may use operation point descriptors for each operation point to select one of the operation points of a bitstream to be decoded.

Each PMT or PSM may include an operation point descriptor that describes characteristics of an operation point. For example, source device 20 may provide the operation point descriptor to provide a rendering capability value that describes a rendering capability for client device 40. In order for client device 40 to properly render (e.g., display) video data of the operation point, client device 40 should satisfy the rendering capabilities signaled by the rendering capability value. The rendering capability value may describe, for example, a number of views to be displayed (e.g., a number of views targeted for rendering) and/or the frame rate of the video data for the views. Thus, client device 40 may determine that the rendering capabilities are satisfied when video output 44 of client device 40 is able to display the number of views of the operation point at the frame rate specified by the operation point descriptor.

In examples in which source device 20 transmits an MVC bitstream using multicast or broadcast protocols, source device 20 may packetize the entire MVC bitstream into transport streams, which may be received by client devices having various rendering capabilities. For example, some three-dimensional programs may have different numbers of views (e.g., two views, four views, six views, or eight views), and various devices may be capable of using anywhere between one and four pairs of views. Thus, each client device may determine which operation point to use based on the supported number of views that can be displayed by the client device. For example, client device 40 may determine which of the operation points to use by determining a number of views that can be displayed by video output 44 and a frame rate at which video output 44 is capable of displaying video data and determining which of the operation points should be used based on the rendering capabilities of video output 44.

In examples in which the source device transmits an MVC bitstream using a unicast protocol, client device 40 may establish a session corresponding to a program with an acceptable number of views by checking the rendering capability specified in corresponding operation point descriptors. Similarly, in examples in which the MVC bitstream is encoded in a computer-readable storage medium for local playback, client device 40 may select a suitable program by checking the rendering capability specified in the operation point descriptors of the PMTs or PSMs.

Source device 20 may also provide a decoding capabilities value in an operation point descriptor. The number of views to be decoded may not necessarily be the same as the number of views to be displayed. Therefore, the operation point descriptor may separately signal the number of views to be displayed and the number of views to be decoded for the operation point. Moreover, the operation point descriptor may specifically identify the views corresponding to the operation point. Certain client devices may prefer particular views for various purposes, e.g., based on viewing angle. Accordingly, client device 40 may be configured to select an operation point based on which views are available in the operation point.

In some examples, the decoding capabilities signaled in the operation point may additionally or alternatively specify a profile and a level to which the operation point correspond. In examples in which source device 20 transmits the bitstream using multicast or broadcast protocols, various client devices with different decoding capabilities may receive the bitstream. For example, some decoders might only be capable of decoding two views with 30 fps, while some might be capable of decoding four views with 60 fps. In examples in which source device 20 transmits the bitstream using a unicast protocol, client device 40 may establish a suitable session (for a specific three-dimensional program) after checking the decoding capability specified in the descriptors in PMTs. Similarly, for local playback, client device 40 may select a suitable program by checking the decoding capability specified in the operation point descriptors of PMTs or PSMs.

Source device 20 may additionally signal bitrate information in the operation point descriptor. The bitrate information may describe either or both of the average bitrate and/or the maximum bitrate for the operation point. For example, when source device 20 transmits the bitstream using a unicast protocol, the channel used to transmit the bitstream may be limited in terms of bandwidth. Accordingly, client device 40 may select an operation point having a tolerable maximum or average bitrate for the communication channel.

In some examples, source device 20 may further specify the frame rate of the operation point in the operation point descriptor. Certain views of the operation point may have frame rates that do not match the frame rate of the operation point. Thus, client device 40 may determine the frame rate of the operation point and the frame rate of such a view to ease the process of reassembling the decoded video data for the purposes of displaying the video data. In various examples, when the frame rates of two operation points do not match, client device 40 may drop frames from views of the operation point having the higher frame rate or interpolate frames from views of the operation point having the lower frame rate.

Typically, an elementary stream includes flags "no_sei_nal_unit_present" and "no_prefix_nal_unit_present" that describe, respectively, whether the elementary stream includes SEI messages and prefix NAL units. This disclosure proposes that client devices, such as client device 40, deduce whether SEI messages and/or prefix NAL units are present within an operation point, rather than explicitly signaling these values for the operation point. To determine whether SEI messages are present in an operation point, client device 40 may determine whether the maximum value of the no_sei_nal_unit_present values of the elementary streams for the operation point is equal to one. Similarly, to determine whether prefix NAL units are present in the operation point, client device 40 may determine whether the maximum value of the no_prefix_nal_unit_present values of the elementary streams for the operation point is equal to one.

The examples discussed above have focused on operation point descriptors included for each operation point of an MVC bitstream. As an alternative, source device 20 may provide MVC extension descriptors that signal similar data. For example, source device 20 may associate more than one MVC extension descriptor with an MVC video sub-bitstream that corresponds to an elementary stream. Source device 20 may specify, in the MVC extension descriptor for a sub-bitstream, a frame rate, a view_id subset of the views to be displayed, and a number of views to be decoded. Source device 20 may further signal a mapping between the MVC extension descriptors and the corresponding operation point.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination will be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "x" and "by" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra-(I), or inter-(P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, multiplexer 30, and demultiplexer 38 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, multiplexer 30, and/or demultiplexer 38 may comprise an integrated circuit, a microprocessor, and/or a wireless communication device, such as a cellular telephone.

The techniques of this disclosure may offer certain advantages over the conventional techniques for MVC sub-bitstreams, which do not provide for signaling characteristics of operation points. Each sub-bitstream may include one or more views of the corresponding bitstream. In some cases, an operation point may correspond to views of different bitstreams. The techniques of this disclosure provide an operation point descriptor that identifies the views of the corresponding operation point.

After multiplexer 30 has assembled a NAL unit and/or an access unit from received data, multiplexer 30 passes the unit to output interface 32 for output. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the NAL unit or access unit to a computer-readable medium 34, such as, for example, a transmission signal, a magnetic medium, an optical medium, a memory, a flash drive, or other computer-readable medium.

Ultimately, input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to demultiplexer 38. Demultiplexer 38 may demultiplex a transport stream or program stream into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44. Video output 44 may comprise a display that uses a plurality of views of a scene, e.g., a stereoscopic or autostereoscopic display that presents each view of a scene simultaneously.

In particular, demultiplexer 38 may select an operation point of a received bitstream. For example, demultiplexer 38 may compare characteristics of operation points of the bitstream to select an appropriate operation point to be used by A/V destination device 40. In general, demultiplexer 38 may attempt to select one of the operation points that will provide the highest quality viewing experience for a user that can be decoded by video decoder 48. For example, demultiplexer 38 may compare the rendering capabilities and decoding capabilities of video decoder 48 to the suggested rendering and decoding capabilities signaled by the operation point descriptors of the bitstream. Of the operation points that demultiplexer 38 determines could be properly decoded by video decoder 48, demultiplexer 38 may select an operation point that will provide the highest quality video data, e.g., the highest frame rate and/or bitrate. In other examples, demultiplexer 38 may select one of the supported operation points based on other considerations, such as, for example, power consumption.

Figure 2:
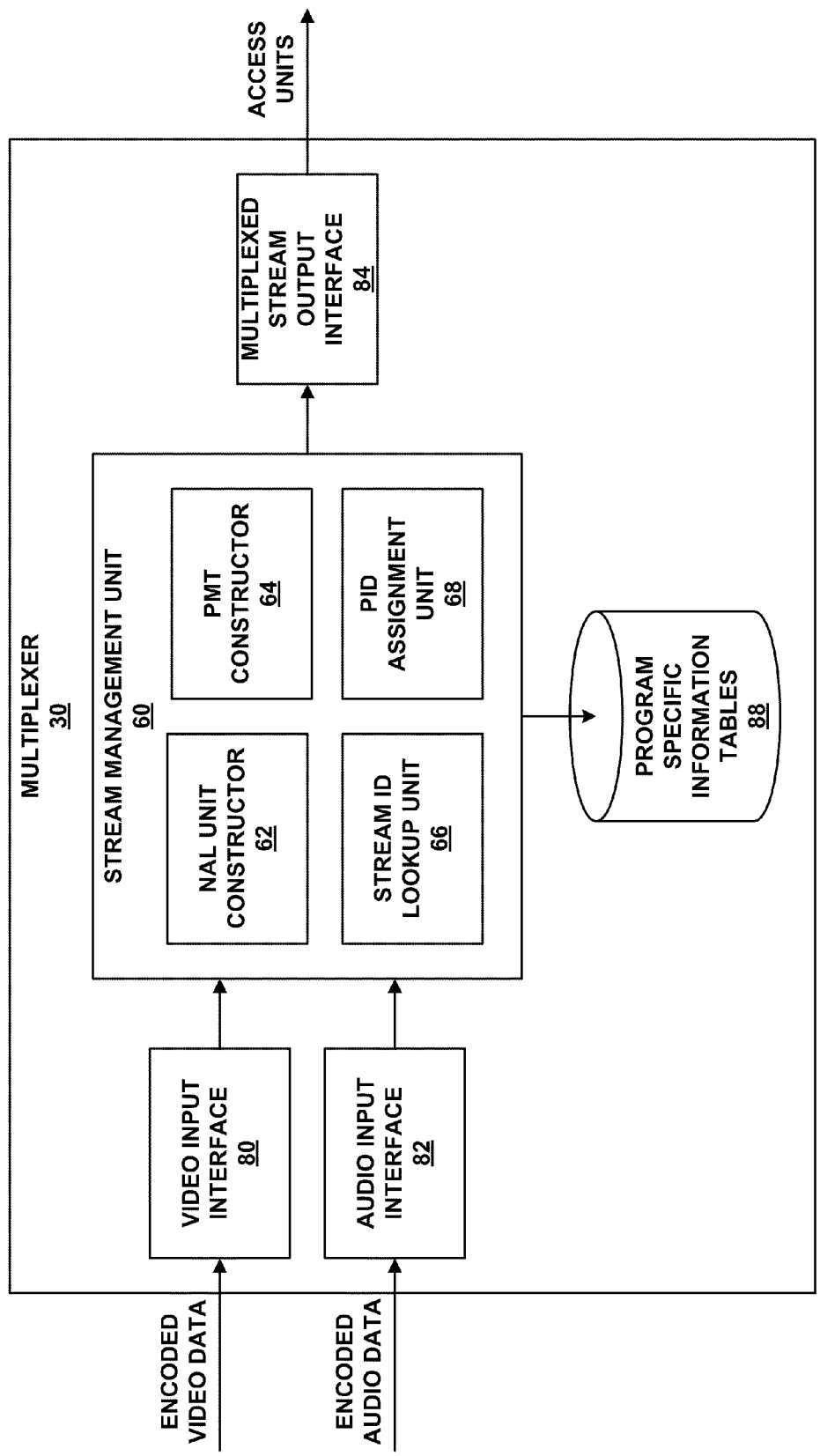
FIG. 2 is a block diagram illustrating an example arrangement of components of a multiplexer consistent with this disclosure.

FIG. 2 is a block diagram illustrating an example arrangement of components of multiplexer 30 (FIG. 1). In the example of FIG. 2, multiplexer 30 includes stream management unit 60, video input interface 80, audio input interface 82, multiplexed stream output interface 84, and program specific information tables 88. Stream management unit 60 includes NAL unit constructor 62, PMT constructor 64, stream identifier (stream ID) lookup unit 66, and program identifier (PID) assignment unit 68.

In the example of FIG. 2, video input interface 80 and audio input interface 82 include respective packetizers for forming PES units from encoded video data and encoded audio data. In other examples, video and/or audio packetizers may be included in a unit or module that is external to multiplexer 30. With respect to the example of FIG. 2, video input interface 80 may form PES packets from encoded video data received from video encoder 28 and audio input interface 82 may form PES packets from encoded audio data received from audio encoder 26.

Stream management unit 60 receives PES packets from video input interface 80 and audio input interface 82. Each PES packet includes a stream ID identifying the elementary stream to which the PES packet belongs. Stream ID lookup unit 66 may determine a program to which the PES packet corresponds by querying program specific information tables 88. That is, stream ID lookup unit 66 may determine to which program a received PES packet corresponds. Each program may comprise a plurality of elementary streams, while in general, one elementary stream corresponds to only one program. However, in some examples, an elementary stream may be included in a plurality of programs. Each PES packet may be included in a plurality of streams output from multiplexer 30, as various services may each include various subsets of available audio and video streams. Accordingly, stream ID lookup unit 66 may determine whether a PES packet should be included in one or more output streams (e.g., one or more transport or program streams), and particularly in which of the output streams to include the PES packet.

In one example, each elementary stream corresponds to a program. Multiplexer 30 may be responsible for ensuring that each elementary stream is associated with a particular program, and accordingly, a program ID (PID). When a PES packet is received including a stream ID that is not recognized by multiplexer 30 (e.g., a stream ID not stored in program specific information tables 88), PID assignment unit 68 creates one or more new entries in program specific information tables 88 to associate the new stream ID with an unused PID.

After determining a program to which a PES packet corresponds, NAL unit constructor 62 forms a NAL unit comprising the PES packet, e.g., by encapsulating the PES packet with a NAL unit header, including the PID of the program to which the stream ID of the PES packet corresponds. In some examples, NAL unit constructor 62, or another sub-unit of stream management unit 60, may form an access unit comprising a plurality of NAL units.

PMT constructor 64 creates Program Map Tables (PMTs) for a corresponding output stream of multiplexer 30 using information from program specific information tables 88. In another example, stream management unit 60 may comprise a PSM constructor for creating program stream maps for a program stream output by multiplexer 30. In some examples, multiplexer 30 may comprise both PMT constructor 64 and a PSM constructor and output either or both of a transport stream and a program stream. In the example of FIG. 2, PMT constructor 64 may construct a PMT including the new descriptors described by this disclosure, e.g., an operation point descriptor, as well as any other necessary descriptors and PMT data for the PMT. PMT constructor 64 may periodically, e.g., after a certain period of time or after a certain amount of data has been transmitted, send a subsequent PMT for the transport stream. PMT constructor 64 may pass created PMTs to NAL unit constructor 62 for forming a NAL unit comprising the PMT, e.g., by encapsulating the PMT with a corresponding NAL unit header, including the corresponding PID.

PMT constructor 64 may create a data structure, such as an operation point descriptor, for each operation point of a program. The data structure created by PMT constructor 64 may signal a rendering capability value that describes a rendering capability to be satisfied by a receiving device to use the operation point, a decoding capability value that describes a decoding capability to be satisfied by the receiving device to use the operation point, and a bitrate value that describes a bitrate of the operation point.

For example, PMT constructor 64 may determine a number of views to be displayed for an operation point and a frame rate for the views of the operation point based on information stored by program specific information tables 88 or information received from video encoder 28 via video input interface 80. PMT constructor 64 may signal either or both of the number of views and the frame rate for the views of the operation point using the rendering capability value of the data structure.

PMT constructor 64 may also determine a number of views to be decoded for the operation point and a level value for a profile to which the views of the operation point correspond. For example, PMT constructor 64 may determine a number of macroblocks that need to be processed, a decoded picture buffer size, a coded picture buffer size, a vertical motion vector range, a maximum number of motion vectors per two consecutive macroblocks, and/or whether a B-block can have sub-macroblock partitions less than 8×8 pixels, and use these determinations to determine the level for the operation point. PMT constructor 64 may receive this information from video encoder 28 via video input interface 80. PMT constructor 64 may then represent the number of views to be decoded and/or the level value of the profile using the decoding capability value for the operation point.

PMT constructor 64 may further determine a bitrate value for the operation point and encode the bitrate value in the data structure. The bitrate value may correspond to an average bitrate or a maximum bitrate for the operation point. PMT constructor 64 may calculate the bitrate for the operation point or receive an indication of the bitrate from video encoder 28.

Multiplexed stream output interface 84 may receive one or more NAL units and/or access units from stream management unit 60, e.g., NAL units comprising PES packets (e.g., audio or video data) and/or NAL units comprising a PMT. In some examples, multiplexed stream output interface 84 may form access units from one or more NAL units corresponding to a common temporal location after the NAL units are received from stream management unit 60. Multiplexed stream output interface 84 transmits the NAL units or access units as output in a corresponding transport stream or program stream. Multiplexed stream output interface 84 may also receive the data structure from PMT constructor 64 and include the data structure as part of the bitstream.

Figure 3:
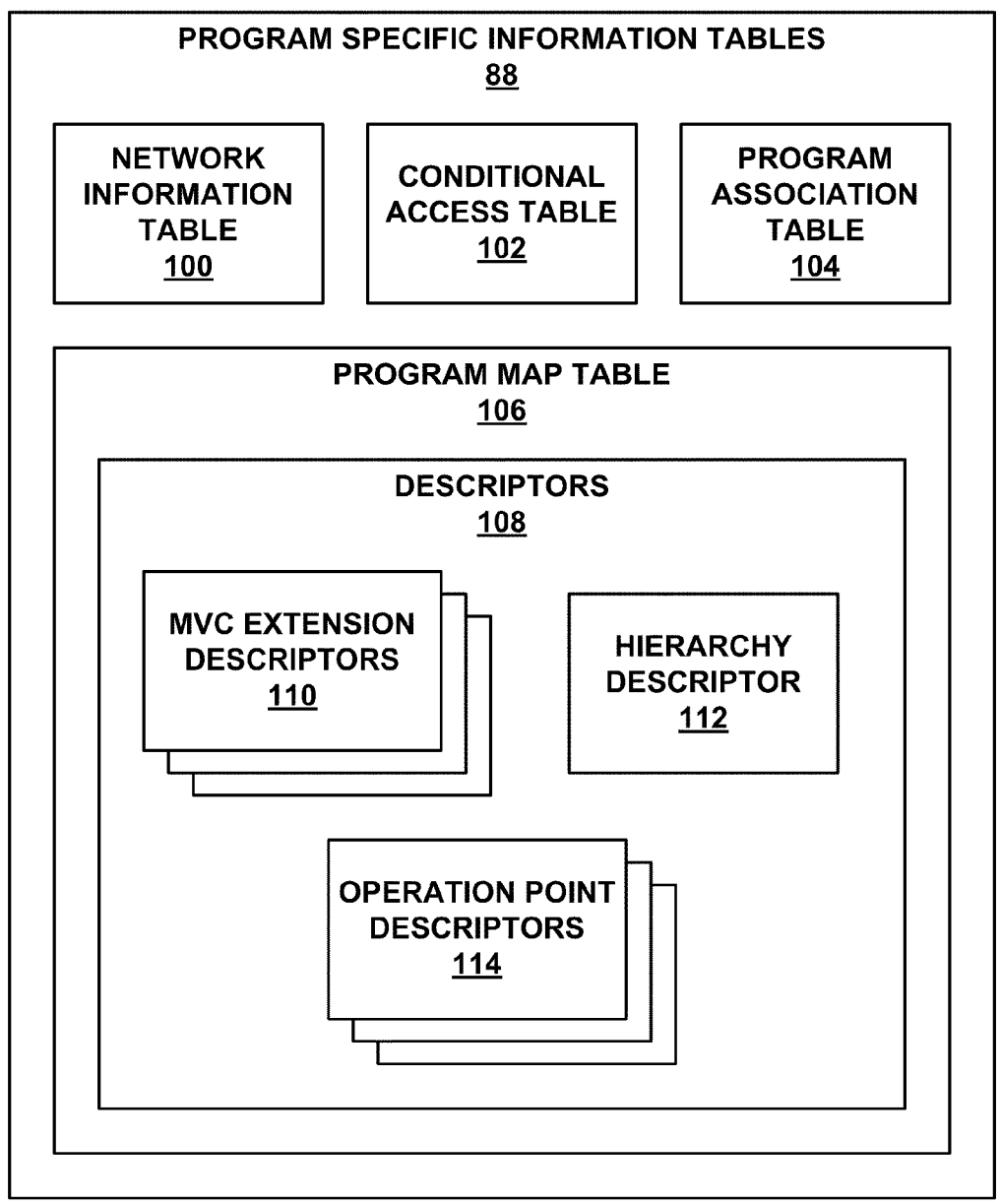
FIG. 3 is a block diagram illustrating an example set of program specific information tables consistent with this disclosure.

FIG. 3 is a block diagram illustrating an example set of program specific information tables 88. The elementary stream to which a transport packet belongs can be determined based on the PID value of the transport packet. In order for a decoder to properly decode received data, the decoder needs to be able to determine which elementary streams belong to each program. Program specific information, as included in program specific information table 88, may explicitly specify relationships between the programs and component elementary streams. In the example of FIG. 3, program specific information tables 88 include network information table 100, conditional access table 102, program access table 104, and program map table 106. For the example of FIG. 3, it is assumed that the output stream comprises an MPEG-2 transport stream. In an alternative example, the output stream may comprise a program stream, in which case program map table 106 may be substituted with a program stream map.

The MPEG-2 Systems specification specifies that every program carried in a transport stream has a program map table, such as program map table 106, associated with it. Program map table 106 may include details about the program and the elementary streams that the program includes. As one example, a program, identified as program number 3, may contain a video elementary stream with PID 33, an English audio stream with PID 57, and a Chinese audio stream with PID 60. It is permitted for a PMT to include more than one program.

The basic program map table specified by MPEG-2 systems specification may be embellished with some of the many descriptors, e.g., descriptors 108, specified within the MPEG-2 systems specification. Descriptors 108 may include any or all of the specified descriptors of the MPEG-2 systems specification. In general, descriptors, such as descriptors 108, convey further information about a program or its component elementary streams or sub-bitstreams. The descriptors may include video encoding parameters, audio encoding parameters, language identification, pan-and-scan information, conditional access details, copyright information, or other such information. A broadcaster or other user may define additional private descriptors.

This disclosure provides an operation point descriptor to describe characteristics of an operation point in an MPEG-2 systems conforming bitstream. Descriptors 108 may include operation point descriptors for each operation point of the corresponding bitstream. As show in FIG. 3, descriptors 108 include MVC extension descriptors 110, hierarchy descriptor 112, and operation point descriptors 114. Each of operation point descriptors 114 may correspond to a particular operation point of a bitstream and signal, for the operation point, a rendering capability value that describes a rendering capability to be satisfied by a receiving device to use the operation point, a decoding capability value that describes a decoding capability to be satisfied by the receiving device to use the operation point, and a bitrate value that describes a bitrate of the operation point. In the video related component elementary streams, there is also a hierarchy descriptor, which provides information to identify the program elements containing components of hierarchically-coded video, audio, and private streams.

Table 1 below provides one example of data included in MVC extension descriptors 110. The various fields and bit depths of the fields, shown in Table 1, are merely one example. In one example, each MVC video sub-bitstream is associated with a corresponding one of MVC extension descriptors 110 that specifies the characteristics of the corresponding MVC video sub-bitstream. An MVC video sub-bitstream may need to assemble other MVC video sub-bitstreams. That is, in order to decode and present a particular sub-bitstream, a client device may need to extract and decode video data from other sub-bitstreams of a common bitstream that includes the two sub-bitstreams.

TABLE 1

| MVC extension descriptor | | |
|---|---|---|
| Syntax | No. Of bits | Mnemonic |
| MVC_extension_descriptor( ) { | | |
|    descriptor_tag | 8 | uimsbf |
|    descriptor_length | 8 | uimsbf |
|    average_bit_rate | 16 | uimsbf |
|    maximum_bitrate | 16 | uimsbf |
|    reserved | 4 | bslbf |
|    view_order_index_min | 10 | bslbf |
|    view_order_index_max | 10 | bslbf |
|    temporal_id_start | 3 | bslbf |
|    temporal_id_end | 3 | bslbf |
|    no_sei_nal_unit_present | 1 | bslbf |
|    reserved | 1 | bslbf |
| } | | |

In the example of Table 1, the descriptor tag field may correspond to an eight-bit descriptor tag field that is included in every descriptor, as set forth by the MPEG-2 Systems standard, to particularly identify the descriptor. The MPEG-2 Systems standard defines certain descriptor tags and marks other descriptor tag values, e.g., values 36 to 63, as "reserved." Amendment 4 to the MPEG-2 Systems standard, however proposes setting the MVC extension descriptor to "49," which corresponds to one of the reserved descriptor tags as specified in the MPEG-2 Systems specification. This disclosure, thus, proposes setting the value of the descriptor_tag of MVC extension descriptors 110 to a value of "49."

Again, the descriptor length field may correspond to an eight-bit descriptor length field that is also included in every descriptor, as set forth by the MPEG-2 Systems standard. Multiplexer 30 may set the value of the descriptor length field equal to the number of bytes of the corresponding one of MVC extension descriptors 110 immediately following the descriptor length field. Because the length of an MVC extension descriptor does not change, multiplexer 30 may set the value of the descriptor length field for each of MVC extension descriptors 110 to a value of eight, to represent the presence of eight bytes of information following the descriptor length field.

The average bit rate field may comprise a sixteen-bit field that indicates the average bit rate, in kilobits per second, of a re-assembled AVC video stream. That is, the average bit rate field describes the average bit rate for a video stream when the video stream is assembled from constituent parts of the transport stream or program stream to which the one of MVC extension descriptors 110 corresponds. In some examples, multiplexer 30 may set the value of the average bit rate field to zero to indicate that the average bit rate is not indicated by the one of MVC extension descriptors 110.

The maximum bit rate field may comprise a sixteen-bit field that indicates the maximum bit rate, in kilobits per second, of the re-assembled AVC video stream. That is, the maximum bit rate field describes the maximum bit rate for a video stream when the video stream is assembled from constituent parts of the transport stream or program stream to which the one of MVC extension descriptors 110 corresponds. In some examples, multiplexer 30 may set the value of the maximum bit rate field to zero to indicate that the maximum bit rate is not indicated by the one of MVC extension descriptors 110.

The view order index minimum field may comprise a ten bit field that indicates the minimum value of the view order index of all the NAL units contained in the associated MVC video sub-bitstream. Similarly, the view order index maximum field is a ten bit field that indicates the maximum value of the view order index of all the NAL units contained in the associated MVC video sub-bitstream.

The temporal ID start field may comprise a three-bit field that indicates the minimum value of the temporal_id of the NAL unit header syntax element of all the NAL units contained in the associated MVC video sub-bitstream. That is, a temporal ID value is included in a header for each NAL unit. In general, the temporal ID value corresponds to a particular framerate, where relatively larger temporal ID values correspond to higher framerates. For example, a value of '0' for a temporal ID may correspond to a framerate of 15 frames per second (fps), a value of '1' for a temporal ID may correspond to a framerate of 30 fps. In this manner, gathering all pictures having a temporal ID of 0, in this example, into a set may be used to form a video segment having a framerate of 15 fps, whereas gathering all pictures having a temporal ID of 0 and all pictures having a temporal ID of 1 into a different set may be used to form a different video segment having a framerate of 30 fps. Multiplexer 30 determines the smallest temporal ID of all of the NAL units of the MVC video sub-bitstream and sets the value of the temporal ID start field equal to this determined smallest temporal ID value.

The temporal ID end field may comprise a three-bit field that indicates the maximum value of the temporal ID of the NAL unit header syntax element of all the NAL units contained in the associated MVC video sub-bitstream. Accordingly, multiplexer 30 determines the largest temporal ID of all of the NAL units of the MVC video sub-bitstream and sets the value of the temporal ID start field equal to this determined largest temporal ID value.

The no SEI NAL unit present field may comprise a one-bit flag that, when set to '1,' indicates that no supplemental enhancement information NAL units are present in the associated MVC video sub-bitstream. Multiplexer 30 may determine whether one or more supplemental enhancement information NAL units have been placed in the bitstream and set the value of the no SEI NAL unit present field to a value of '1' when there are no SEI NAL units in the bitstream, but may set the value of the no SEI NAL unit present field to a value of '0' when at least one SEI NAL unit is present in the bitstream.

Table 2 below provides one example of data included in hierarchy descriptor 112. In MPEG-2 systems, a hierarchy descriptor may be defined for a program stream of video that contains an embedded video program stream. The various fields and bit depths of the fields, shown in Table 2, are provided as one example. The hierarchy_layer_index value identifies the layer index of the current program stream, and the hierarchy_embedded_layer_index value identifies a dependent layer. In MVC design, a program stream may depend on another program stream using the hierarchy descriptor. That is, dependencies between program streams may be determined based on data included in the hierarchy descriptor.

TABLE 2

Hierarchy descriptor

| Syntax | No. Of bits | Mnemonic |
|---|---|---|
| hierarchy_descriptor( ) { | | |
|    descriptor_tag | 8 | uimsbf |
|    descriptor_length | 8 | uimsbf |
|    reserved | 1 | bslbf |
|    temporal_scalability_flag | 1 | bslbf |
|    spatial_scalability_flag | 1 | bslbf |
|    quality_scalability_flag | 1 | bslbf |
|    hierarchy_type | 4 | Uimsbf |
|    reserved | 2 | bslbf |
|    hierarchy_layer_index | 6 | uimsbf |
|    Tref_present_flag | 1 | bslbf |
|    reserved | 1 | bslbf |
|    hierarchy_embedded_layer_index | 6 | uimsbf |
|    reserved | 2 | bslbf |
|    hierarchy_channel | 6 | uimsbf |
| } | | |

As noted above, the MPEG-2 Systems specification specifies that each descriptor includes a descriptor tag field and a descriptor length field. Accordingly, hierarchy descriptor 112 includes a descriptor tag field and a descriptor length field. In accordance with the MPEG-2 Systems specification, multiplexer 30 may set the value of the descriptor tag field to a value of "4" for hierarchy descriptor 112.

The length of hierarchy descriptor 112 can be determined a priori, because each instance of hierarchy descriptor 112 should include the same amount of data. In one example, multiplexer 30 may set the value of the descriptor length field to a value of four, indicative of four bytes in an instance of hierarchy descriptor 112 following the end of the descriptor length field.

The hierarchy type field describes the hierarchical relation between the associated hierarchy layer and its hierarchy embedded layer. In one example, multiplexer 30 sets the value of the hierarchy type field based on the hierarchical relationship, e.g., as described by Table 3 below. As one example, when scalability applies in more than one dimension, multiplexer 30 may set the hierarchy type field to a value of "8" ("Combined Scalability" as shown in Table 3), and multiplexer 30 sets values of the temporal scalability flag field, the spatial scalability flag field, and the quality scalability flag field according to data retrieved from PES packets and PES packet headers of the respective streams. In general, multiplexer 30 may determine dependencies between the different streams corresponding to various views and/or audio data streams. Multiplexer 30 may also determine whether a dependent stream that comprises an enhancement layer is a spatial layer, a signal-to-noise (SNR) enhancement layer, a quality enhancement layer, or another type of enhancement layer.

As another example, for MVC video sub-bitstreams, multiplexer 30 may set the hierarchy type field to a value of '9' ("MVC" as shown in Table 3) and may set the values of each of the scalability flag field, the spatial scalability flag field, and the quality scalability flag field to '1'. As yet another example, for MVC base view sub-bitstreams, multiplexer 30 may set the value of the hierarchy type field to a value of '15' and may set values of the scalability flag field, the spatial scalability flag field, and the quality scalability flag field to '1'. As still another example, for Prefix MVC sub-bitstream, multiplexer 30 may set the hierarchy type field to a value of '14' and may set the scalability flag field, the spatial scalability flag field, and the quality scalability flag field to '1.'

The hierarchy layer index field may comprise a six-bit field that defines a unique index of the associated program element in a table of coding layer hierarchies. Indices may be unique within a single program definition. For video sub-bitstreams of AVC, video streams conforming to one or more profiles defined in Annex G of ITU-T Rec. H.264|ISO/IEC 14496-10, this is the program element index, which is assigned in a way that the bitstream order will be correct if associated SVC dependency representations of the video sub-bitstreams of the same access unit are re-assembled in increasing order of hierarchy_layer_index. For MVC video sub-bitstreams of AVC video streams conforming to one or more profiles defined in Annex H of ITU-T Rec. H.264|ISO/IEC 14496-10, this is the program element index, which is assigned in a way that any of these values are larger than the hierarchy_layer_index value specified in the hierarchy descriptor for the prefix MVC sub-bitstream.

The hierarchy embedded layer index field may comprise a six-bit field that defines the hierarchy table index of the program element that needs to be accessed before decoding of the elementary stream associated with the corresponding instance of hierarchy descriptor 112. This disclosure leaves the value for the hierarchy embedded layer index field undefined for when the hierarchy type field has a value of 15 (that is, a value corresponding to the base layer).

The hierarchy channel field may comprise a six-bit field that indicates the intended channel number for the associated program element in an ordered set of transmission channels. The most robust transmission channel is defined by the lowest value of the hierarchy channel field, with respect to the overall transmission hierarchy definition. Note that a given hierarchy channel may at the same time be assigned to several program elements.

Reserved fields of Tables 1 and 2 are reserved for future use by future standards development. The techniques of this disclosure do not, at this time, propose assigning semantic meaning to values of the reserved fields.

Table 3 below illustrates the potential values for the hierarchy type field described above:

TABLE 3

Hierarchy type field values

| Value | Description |
|---|---|
| 0 | Reserved |
| 1 | Spatial Scalability |
| 2 | SNR Scalability |
| 3 | Temporal Scalability |
| 4 | Data partitioning |
| 5 | Extension bit-stream |
| 6 | Private Stream |
| 7 | Multi-view Profile |
| 8 | Combined Scalability |
| 9 | MVC video sub-bitstream |
| 10-13 | Reserved |
| 14 | Prefix MVC sub-bitstream |
| 15 | Base layer, or MVC base view sub-bitstream, or AVC video sub-bitstream of MVC |

In some examples, hierarchy descriptor 112 may be used to signal an MVC sub-bitstream signaled by incremental sub-bitstream and embedded sub-bitstreams. The embedded sub-bitstreams include the direct dependent sub-bitstream corresponding to the hierarchy_embedded_layer_index and all the embedded sub-bitstreams of this direct dependent sub-bitstream. In this disclosure, the views that are explicitly contained are called enhance views, while the views that are embedded are called dependent views.

In an example in which the output of multiplexer 30 comprises a program stream, program specific information tables 88 may include a program stream map (PSM). A PSM may provide a description of the elementary streams in the corresponding program stream and the relationships of the elementary streams to one another. In some examples, a program stream map may also correspond to a transport stream. When carried in a corresponding transport Stream, the PSM structure should not be modified. Multiplexer 30 may indicate that a PSM is present in a PES packet by setting the stream_id value of the PES packet to 0xBC, that is, the hexadecimal value BC, which corresponds to the binary value 10111100, or the decimal value 188.

Multiplexer 30 maintains a complete list of all programs available in a transport stream in program association table 104. Multiplexer 30 also may embed program association tables in NAL units. Multiplexer 30 may indicate that a NAL unit includes a program association table by assigning the NAL unit a PID value of 0. Multiplexer 30 may list each program, along with the PID value of the transport packets that contain the corresponding program map table, in program association table 104. Using the same example mentioned above, the example program map table that specifies the elementary streams of program number 3 has a PID of 1001 and another PMT has another PID of 1002. This or similar sets of information may be included in program association table 104.

Program specific information tables 88 also includes network information table (NIT) 100 and conditional access table (CAT) 102. Program number zero, as specified in PAT, has a special meaning. In particular, program number zero may be used to point the way to network information table 100. The table is optional and when present, the table may provide information about the physical network carrying the transport stream such as channel frequencies, satellite transponder details, modulation characteristics, service originator, service name, and details of alternative networks available.

If any elementary streams within a transport stream are scrambled, then a conditional access table 102 must be present. Conditional access table 102 provides details of the scrambling system(s) in use and provides the PID values of transport packets that contain the conditional access management and entitlement information. The format of this information is not specified within the MPEG-2 systems standard.

Figure 4:
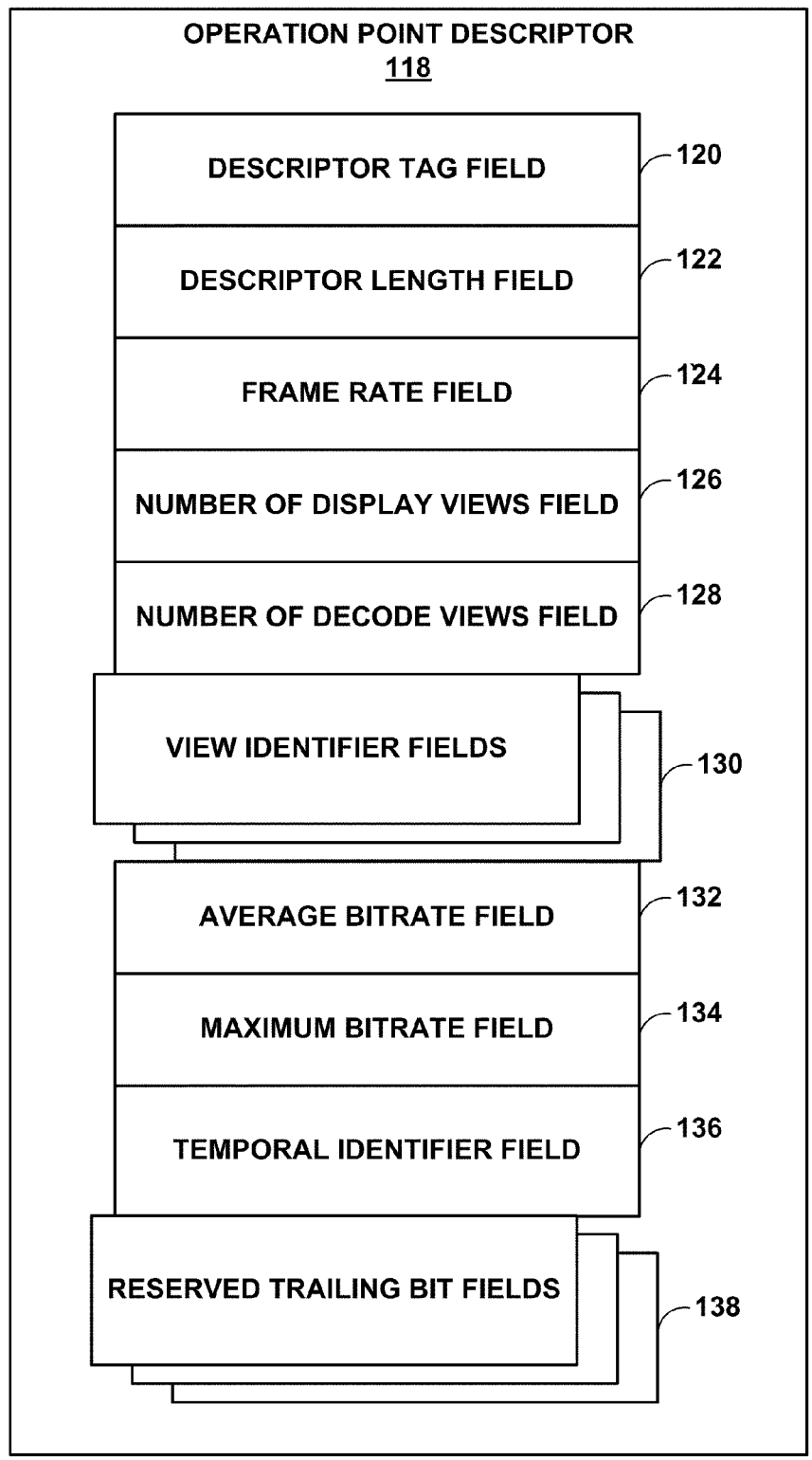
FIGS. 4-6 are conceptual diagrams illustrating various examples of sets of data that may be included in an operation point descriptor.

FIG. 4 is a block diagram illustrating an example set of data that may be included in one of operation point descriptors 114 (FIG. 3). In the example of FIG. 4, operation point descriptor 118 includes descriptor tag field 120, descriptor length field 122, frame rate field 124, number of display views field 126, number of decode views field 128, view identifier fields 130, average bitrate field 132, maximum bitrate field 134, temporal identifier field 136, and reserved trailing bit fields 138.

Figure 5:
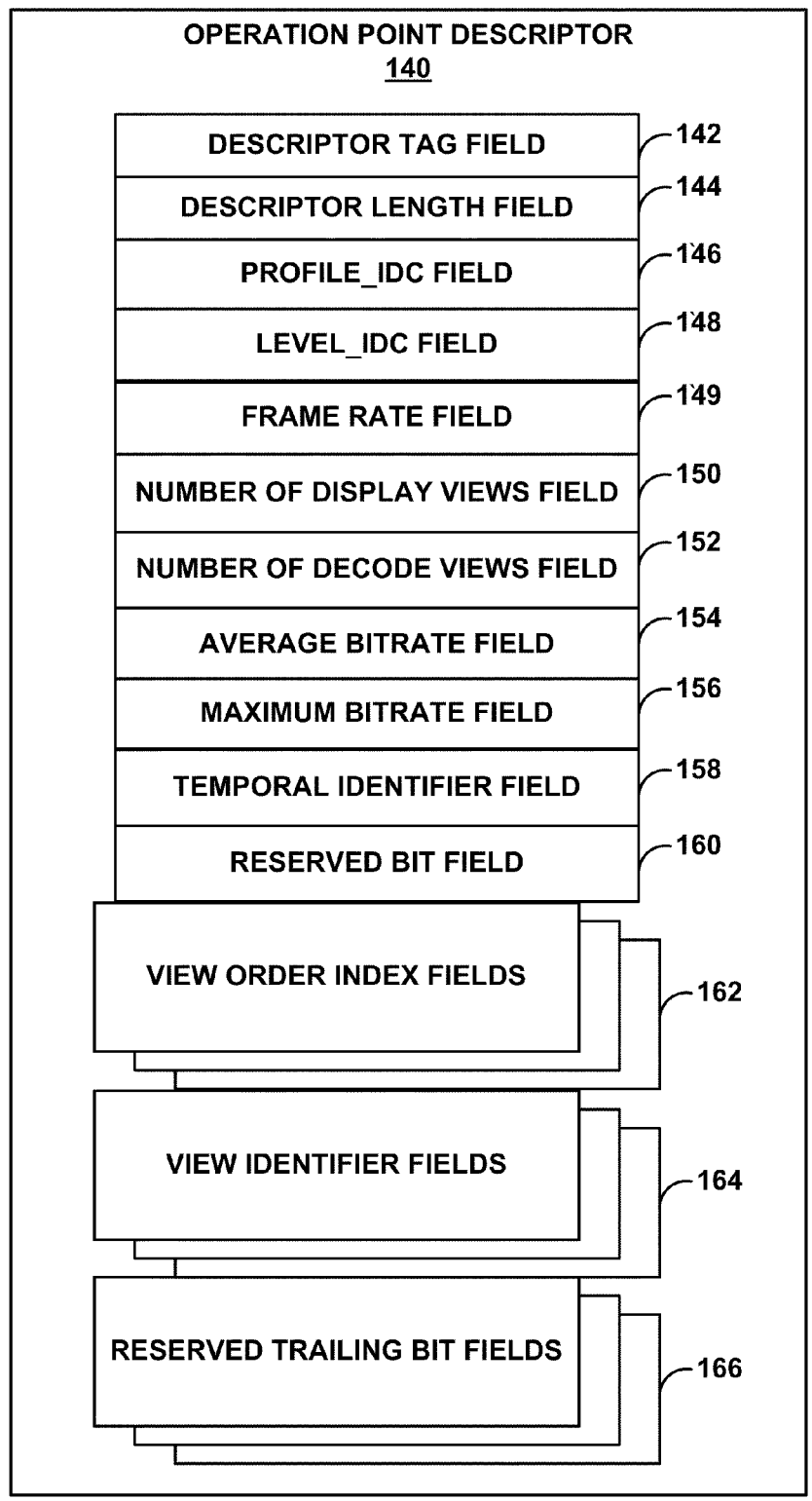
Figure 6:
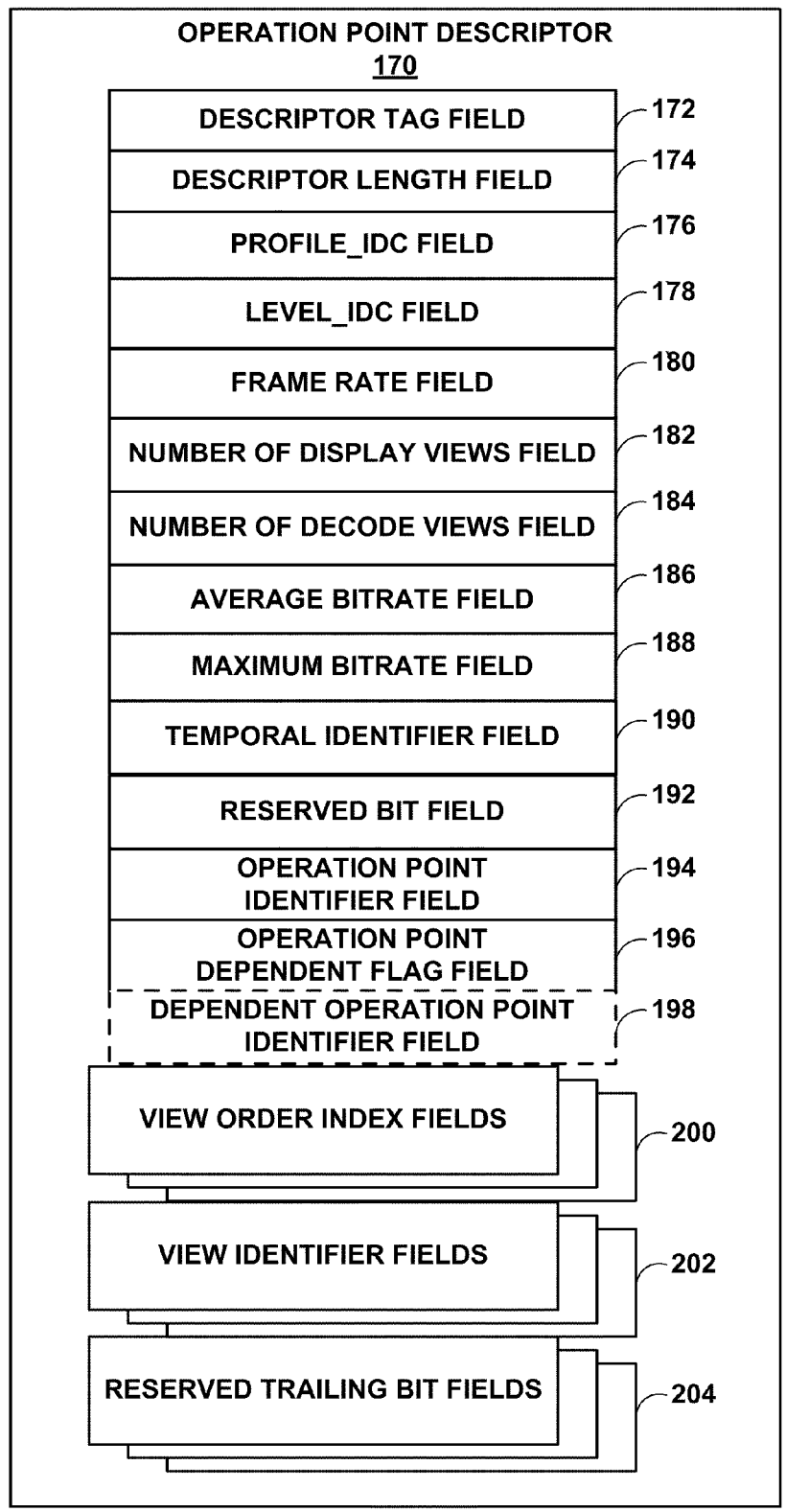

In the example of FIG. 4, frame rate field 124 and number of display views field 126 correspond to an example rendering capability value, number of decode views field 128 corresponds to an example decoding capability value, and average bitrate field 132 and maximum bitrate field 134 correspond to an example bitrate value. Operation point descriptor 118 is merely one example of a data structure that may be used to signal characteristics of an operation point, such as a rendering capability, a decoding capability, and a bitrate. FIGS. 5 and 6 below provide alternative examples of operation point descriptors that signal these characteristics.

As described above, the MPEG-2 Systems specification specifies that each descriptor has a descriptor tag field and a descriptor length field, each of 8 bits. Thus, multiplexer 30 (FIG. 1) may assign a value to descriptor tag field 120 indicative of an MVC operation point descriptor. Multiplexer 30 may also determine a number of views for the operation point and a number of reserved bits for the operation point descriptor, and then calculate the length of operation point descriptor 118 in bytes following descriptor length field 122. Multiplexer 30 may assign this calculated length value to descriptor length field 122 when instantiating operation point descriptor 118.

Frame rate field 124 may comprise a 16 bit field that indicates the maximum frame rate, in frame/256 seconds, of the re-assembled AVC video stream. That is, multiplexer 30 may calculate the maximum frame rate of a 256 second time period to set the value of frame rate field 124. In some examples, dividing by 256 may result in a conversion of a floating point value to an integer value. In other examples, time periods other than 256 seconds may be used. The 256 second time period described with respect to frame rate field 124 is merely one potential example for which the maximum frame rate of an operation point may be calculated.

Number of display views field 126 may comprise a ten bit field that indicates the value of the number of the views, targeted for output, the re-assembled AVC video stream. In general, number of display views field 126 represents a number of views to be displayed for a corresponding operation point. Because different displays may be capable of displaying different numbers of views, a client device may use the value of number of display views field 126 to select an operation point that has as many views to be displayed as are possible on the display for the client device. For example, if a client device is capable of displaying four views, the client device may select an operation point with a number of display views field having a value indicating that four views will be displayed for the corresponding operation point. Accordingly, number of display views field 126 can be included as part of a rendering capability value. Likewise, multiplexer 30 may set the value of number of display views field 126 according to a number of views to be displayed for an operation point.

Number of decode views field 128 may comprise a ten bit field that indicates the value of the number of views required for decoding the re-assembled AVC video stream. This value may differ from the number of views to be displayed, indicated by the number of display views field 126. This may result from certain views being required for decoding due to view dependencies, but that are not actually displayed.

Referring briefly to FIG. 7, as an example, views S0 and S1 may be views that are to be displayed for an operation point. View S0 can be decoded directly without decoding any other views. However, to decode view S1, view S2 must also be decoded, because view S1 includes prediction data referring to view S2. Therefore, in this example, number of display views field 126 would have a value of two, but number of decode views field 128 would have a value of three. In some examples, a view to be displayed may be interpolated from one or more other views, such that the number of views to be displayed may be greater than the number of views to be decoded. That is, using a base view and depth information, video decoder 48 (FIG. 1) may interpolate a second view. Video decoder 48 may use two or more views to calculate depth information to interpolate a new view, or video decoder 48 may receive depth information for a view from source device 20.

Number of decode views field 128 may correspond to a decoding capability value, in that a decoder of a client device (such as video decoder 48 of destination device 40) should be capable of decoding a number of views equal to the value of number of decode views field 128. Accordingly, the client device may select an operation point having a number of decode views field representative of a number of views that a video decoder of the client device is capable of decoding.

Operation point descriptor 118 of FIG. 4 also includes view identifier fields 130. Each of view identifier fields 130 may comprise a ten bit field that indicates the value of the view_id of the NAL units contained in the re-assembled AVC video bitstream. Thus, the view identifiers of each displayed view for an operation point are signaled using view identifier fields 130. That is, the view identifiers of view identifier fields 130 correspond to the displayed views. Thus, views that are decoded but not displayed are not signaled by view identifier fields 130, in the example of FIG. 4.

Average bitrate field 132 may comprise a sixteen bit field that indicates the average bit rate, in kilobits per second, of the re-assembled AVC video stream. When set to 0, the average bit rate is not indicated. That is, a value of zero for average bitrate field 132 implies that average bitrate field 132 should not be used for determining the average bitrate of the re-assembled AVC video stream.

Maximum bitrate field 134 may comprise a sixteen bit field that indicates the maximum bit rate, in kbits per second, of the re-assembled AVC video stream. When set to 0, the maximum bit rate is not indicated. That is, when the value of maximum bitrate field 134 is set to zero, maximum bitrate field 134 should not be used for determining the maximum bitrate of the re-assembled AVC video stream.

Temporal identifier field 136 may comprise a three bit field that indicates the value of the temporal_id, corresponding to the frame rate of the re-assembled AVC video stream. That is, the temporal_id can be used to determine the frame rate of the re-assembled AVC video stream, as discussed above.

Example operation point descriptor 118 also includes reserved trailing bit fields 138. In one example, e.g., as shown in Table 4 below, the number of reserved trailing bits may be used both for additional signaling and to pad operation point descriptor 118, such that operation point descriptor 118 ends on a byte boundary. For example, as discussed above, operation point descriptor 118 may use ten bits to represent the view identifier of each displayed view. The static number of bits apart from the bits used for the view identifiers and the reserved trailing bits is 87, in this example. Thus, to ensure that operation point descriptor 118 ends on a byte boundary (that is, has a number of bits that is evenly divisible by eight), multiplexer 30 may add a number of trailing bits according to the following formula:

trailing bits=(1+6*num_display_views) %8 where '%' represents the mathematical modulo operator. That is, A % B results in the remainder of A divided by B, such that the remainder is in the range of integers between 0 and B−1.

Table 4 summarizes an example set of data that may be included in the example of operation point descriptor 118 of FIG. 4.

TABLE 4

MVC operation point descriptor

| Syntax | No. Of bits | Mnemonic |
|---|---|---|
| MVC_op_descriptor( ) { | | |
|   descriptor_tag | 8 | uimsbf |
|   descriptor_length | 8 | uimsbf |
|   frame_rate | 16 | uimsbf |
|   num_display_views | 10 | uimsbf |
|   num_decode_views | 10 | uimsbf |
|   for ( i = 0 ; i< num_display_views; i++) { | | |
|     view_id | 10 | uimsbf |
|   } | | |
|   average_bit_rate | 16 | uimsbf |
|   maximum_bitrate | 16 | uimsbf |
|   temporal_id | 3 | uimsbf |
|   for (i = 0; i<(1 + 6*num_display_views)%8; i++) { | | |
|     reserved_bit | 1 | bslbf |
|   } | | |
| } | | |

FIG. 5 is a block diagram illustrating an alternative example set of data that may be included in one of operation point descriptors 114 (FIG. 3). In general, each of operation point descriptors 114 should have a common format, such that a client device may be configured to receive operation point descriptors of a single format. Thus, each of operation point descriptors 114 may have a format similar to the operation point descriptor of FIG. 4, FIG. 5, or FIG. 6, or another common format that includes similar signaling data.

In the example of FIG. 5, operation point descriptor 140 includes descriptor tag field 142, descriptor length field 144, profile_IDC field 146, level_IDC field 148, frame rate field 149, number of display views field 150, number of decode views fields 152, average bitrate field 154, maximum bitrate field 156, temporal identifier field 158, reserved bit field 160, view order index fields 162, view identifier fields 164, and reserved trailing bit fields 166. IDC stands for "indicator." As explained below, the example of operation point descriptor 140 explicitly signals the profile_idc and level_idc values for an operation point, as well as information on how an operation point is assembled.

Number of display views field 150 and frame rate field 149 correspond to a rendering capabilities value signaled by operation point descriptor 140. Profile_IDC field 146, level_IDC field 148, and number of decode views field 152, in the example of FIG. 5, represent examples of data that may correspond to a decoding capabilities value signaled by operation point descriptor 140. Average bitrate field 154 and maximum bitrate field 156 correspond to a bitrate value signaled by operation point descriptor 140.

As described above, the MPEG-2 Systems specification specifies that each descriptor has a descriptor tag field and a descriptor length field, each of which may be 8 bits in length. Thus, multiplexer 30 (FIG. 1) may assign a value to descriptor tag field 142 indicative of an MVC operation point descriptor. Multiplexer 30 may also determine a number of views for the operation point and a number of reserved bits for the operation point descriptor and then calculate the length of operation point descriptor 140 in bytes following descriptor length field 144. Multiplexer 30 may assign this calculated length value to descriptor length field 144 when instantiating operation point descriptor 140.

Profile_IDC field 146 may comprise an eight bit field that indicates the profile_idc of the operation point re-assembled by the information given in operation point descriptor 140. Level_IDC field 148 may comprise an eight bit field that indicates the level_idc of the operation point re-assembled by the information given in operation point descriptor 140.

Frame rate field 149 may comprise a 16 bit field that indicates the maximum frame rate, in frame/256 seconds, of the re-assembled AVC video stream. That is, multiplexer 30 may calculate the maximum frame rate of a 256 second time period to set the value of frame rate field 149. As with frame rate field 124, in other examples for frame rate field 149, other time periods besides 256 seconds may be used.

Number of display views field 150 may comprise a ten bit field that indicates the value of the number of the views, targeted for output, the re-assembled AVC video stream. In general, number of display views field 150 represents a number of views to be displayed for a corresponding operation point. Number of decode views field 152 may comprise a ten bit field that indicates the value of the number of views required for decoding the re-assembled AVC video stream. This value may differ from the number of views to be displayed, indicated by the number of display views field 150. This may result from certain views being required for decoding due to view dependencies, but that are not actually displayed, e.g., as described above with respect to number of decode views field 128.

Average bitrate field 154 may comprise a sixteen bit field that indicates the average bit rate, in kilobits per second, of the re-assembled AVC video stream. When set to 0, the average bit rate is not indicated. That is, a value of zero for average bitrate field 154 implies that average bitrate field 154 should not be used for determining the average bitrate of the re-assembled AVC video stream. Maximum bitrate field 156 may comprise a sixteen bit field that indicates the maximum bit rate, in kbits per second, of the re-assembled AVC video stream. When set to 0, the maximum bit rate is not indicated. That is, when the value of maximum bitrate field 156 is set to zero, maximum bitrate field 156 should not be used for determining the maximum bitrate of the re-assembled AVC video stream.

Temporal identifier field 158 may comprise a three bit field that indicates the value of the temporal_id, corresponding to the frame rate of the re-assembled AVC video stream. That is, the temporal_id can be used to determine the frame rate of the re-assembled AVC video stream, as discussed above.

Operation point descriptor 140 also includes view order index fields 162 and view identifier fields 164. Each of view order index fields 162 may comprise a ten bit field that indicates the value of the view order index of the NAL units contained in the operation point. A client device may reassemble the NAL units corresponding to all the signaled view_order_index values signaled in operation point descriptor 140 by view order index fields 162. View order index fields 162 include view order index fields for each of the views to be decoded. Given a view_order_index value, a client device can extract the corresponding NAL units from the elementary streams because the MVC extension descriptor tells the range of the view order index values in that elementary stream and the range covers the view_order_index value signaled in the operation point descriptor.

Each of view identifier fields 164 may comprise a ten bit field that indicates the value of the view_id of the NAL units contained in the re-assembled AVC video bitstream. Thus, the view identifiers of each displayed view for an operation point are signaled using view identifier fields 164. That is, the view identifiers of view identifier fields 164 correspond to the displayed views. Thus, views that are decoded but not displayed are not signaled by view identifier fields 164, in the example of FIG. 5.

Operation point descriptor 140 also includes reserved trailing bit fields 166. Operation point descriptor 140 may include trailing bits as padding such that the number of bits in operation point descriptor 140 is evenly divisible by eight. Because the number of view order index fields and view identifier fields may vary, the number of trailing bits that multiplexer 30 includes in operation point descriptor 140 may vary accordingly. For example, the number of trailing bits may be determined according to the following formula trailing bits=(6*(num_display_views+num_decode_views)) %8 where '%' represents the modulo operator.

Table 5 summarizes an example set of data that may be included in the example operation point descriptor 140 of FIG. 5.

TABLE 5

MVC operation point descriptor

| Syntax | No. Of bits | Mnemonic |
|---|---|---|
| MVC_op_descriptor( ) { | | |
|   descriptor_tag | 8 | uimsbf |
|   descriptor_length | 8 | uimsbf |
|   profile_idc | 8 | uimsbf |
|   level_idc | 8 | uimsbf |
|   frame_rate | 16 | uimsbf |
|   num_display_views | 10 | uimsbf |
|   num_decode_views | 10 | uimsbf |
|   average_bit_rate | 16 | |
|   maximum_bitrate | 16 | uimsbf |
|   temporal_id | 3 | uimsbf |
|   reserved_bit | 1 | bslbf |
|   for ( i = 0 ; i< num_decode_views; i++) { | | |
|     view_order_index | 10 | uimsbf |

TABLE 5-continued

MVC operation point descriptor

| Syntax | No. Of bits | Mnemonic |
|---|---|---|
|     } | | |
|     for ( i = 0 ; i< num_display_views; i++) { | | |
|         view_id | 10 | uimsbf |
|     } | | |
|     for ( i = 0 ; i<6*(num_display_views + num_decode_views) %8; i++) { | | |
|         reserved_bit | 1 | bslbf |
|     } | | |
| } | | |

FIG. 6 is a block diagram illustrating another alternative example set of data that may be included in one of operation point descriptors 114 (FIG. 3). In the example of FIG. 6, operation point descriptor 170 includes descriptor tag field 172, descriptor length field 174, profile_IDC field 176, level_IDC field 178, frame rate field 180, number of display views field 182, number of decode views field 184, average bitrate field 186, maximum bitrate field 188, temporal identifier field 190, reserved bit field 192, operation point identifier field 194, operation point dependent flag field 196, optional dependent operation point identifier field 198, view order index fields 200, view identifier fields 202, and reserved trailing bit fields 204. As described below, operation point descriptor 170 provides an example operation point descriptor for an operation point that depends on another operation point and that signals extra views required for decoding.

Number of display views field 182 and frame rate field 180 correspond to a rendering capabilities value signaled by operation point descriptor 140. Profile_IDC field 176, level_IDC field 178, and number of decode views field 184, in the example of FIG. 6, represent examples of data that may correspond to a decoding capabilities value signaled by operation point descriptor 140. Average bitrate field 154 and maximum bitrate field 156 correspond to a bitrate value signaled by operation point descriptor 140.

As described above, the MPEG-2 Systems specification specifies that each descriptor has a descriptor tag field and a descriptor length field, each of 8 bits. Thus, multiplexer 30 (FIG. 1) may assign a value to descriptor tag field 172 indicative of an MVC operation point descriptor. Multiplexer 30 may also determine a number of views for the operation point and a number of reserved bits for the operation point descriptor and then calculate the length of operation point descriptor 170 in bytes following descriptor length field 174. Multiplexer 30 assigns this calculated length value to descriptor length field 174 when instantiating operation point descriptor 140.

Profile_IDC field 176 may comprise an eight bit field that indicates the profile_idc of the operation point re-assembled by the information given in operation point descriptor 170. Level_IDC field 178 may comprise an eight bit field that indicates the level_idc of the operation point re-assembled by the information given in operation point descriptor 170.

Frame rate field 180 may comprise a 16 bit field that indicates the maximum frame rate, in frame/256 seconds, of the re-assembled AVC video stream. That is, multiplexer 30 may calculate the maximum frame rate of a 256 second time period to set the value of frame rate field 149. As with frame rate field 124, in other examples for frame rate field 180, other time periods besides 256 seconds may be used.

Number of display views field 182 may comprise a ten bit field that indicates the value of the number of the views, targeted for output, the re-assembled AVC video stream. In general, number of display views field 182 represents a number of views to be displayed for a corresponding operation point. Number of decode views field 184 may comprise a ten bit field that indicates the value of the number of views required for decoding the re-assembled AVC video stream. This value may differ from the number of views to be displayed, indicated by the number of display views field 182. This may result from certain views being required for decoding due to view dependencies, but that are not actually displayed, e.g., as described above with respect to number of decode views field 128.

Average bitrate field 186 may comprise a sixteen bit field that indicates the average bit rate, in kilobits per second, of the re-assembled AVC video stream. When set to 0, the average bit rate is not indicated. That is, a value of zero for average bitrate field 186 implies that average bitrate field 186 should not be used for determining the average bitrate of the re-assembled AVC video stream. Maximum bitrate field 188 may comprise a sixteen bit field that indicates the maximum bit rate, in kbits per second, of the re-assembled AVC video stream. When set to 0, the maximum bit rate is not indicated. In particular, when the value of maximum bitrate field 188 is set to zero, maximum bitrate field 188 should not be used for determining the maximum bitrate of the re-assembled AVC video stream.

Temporal identifier field 190 may comprise a three bit field that indicates the value of the temporal_id, corresponding to the frame rate of the re-assembled AVC video stream. That is, the temporal_id can be used to determine the frame rate of the re-assembled AVC video stream, as discussed above. Reserved bit field 192 corresponds to a single bit that is reserved for future use.

Operation point descriptor 170 also includes operation point identifier field 194 and operation point dependent flag field 196. Operation point identifier field 194 may comprise a ten bit field that indicates the identifier of the operation point described by operation point descriptor 170. Operation point dependent flag field 196 is a single bit flag that indicates whether a dependency of the current operation point on another operation point is signaled. If operation point dependent flag 196 has a value of one (or true), the dependency is signaled; if the value of operation point dependent flag 196 is zero (or false), the dependency is not signaled.

When the value of operation point dependent flag 196 is true or one, operation point descriptor 170 additionally includes dependent operation point identifier field 198. When present, operation point identifier field 198 may comprise a ten bit field that indicates the identifier of the operation point the current descriptor depends on. That is, when multiplexer 30 determines that operation point descriptor 170 corresponds to an operation point that depends on another operation point, multiplexer 30 sets the value of operation point dependent flag to true or one, and then signals the identifier of the operation point on which the operation point corresponding to operation point descriptor 170 depends.

Operation point descriptor 170 also includes view order index fields 200 and view identifier fields 202. Each of view order index fields 202 may comprise a ten bit field that indicates the value of the view order index of the NAL units contained in the current operation point with an identifier of operation_point_id but not contained in the operation point with an identifier of dependent_operation_point_id. A client device may reassemble the NAL units corresponding to all the signaled view_order_index values signaled in operation point descriptor 170 by view order index fields 200. View order index fields 200 include view order index fields for each of the views to be decoded. Given a view_order_index value, a client device can extract the corresponding NAL units from the elementary streams because the MVC extension descriptor tells the range of the view order index values in that elementary stream and the range covers the view_order_index value signaled in the operation point descriptor. The operation point signaled in operation point descriptor 170 is re-assembled by the NAL units corresponding to all the signaled view_order_index values of view order index fields 200 and the NAL units contained by the operation point with identifier of dependent_operation_point_id.

Each of view identifier fields 202 may comprise a ten bit field that indicates the value of the view_id of the NAL units contained in the re-assembled AVC video bitstream. Thus, the view identifiers of each displayed view for an operation point are signaled using view identifier fields 202. That is, the view identifiers of view identifier fields 164 correspond to the displayed views. Thus, views that are decoded but not displayed are not signaled by view identifier fields 202, in the example of FIG. 5.

Operation point descriptor 170 also includes reserved trailing bit fields 204. Operation point descriptor 170 may include trailing bits as padding such that the number of bits in operation point descriptor 170 is evenly divisible by eight. Because the number of view order index fields and view identifier fields may vary, the number of trailing bits that multiplexer 30 includes in operation point descriptor 170 may vary accordingly. For example, the number of trailing bits may be determined according to the following formula trailing bits=(6*(num_display_views+num_decode_views)) %8 where '%' represents the modulo operator.

Table 6 below summarizes an example set of data that may be included in the example operation point descriptor 170 of FIG. 6.

TABLE 6

MVC operation point descriptor

| Syntax | No. Of bits | Mnemonic |
|---|---|---|
| MVC_op_descriptor( ) { | | |
|   descriptor_tag | 8 | uimsbf |
|   descriptor_length | 8 | uimsbf |
|   profile_idc | 8 | uimsbf |
|   level_idc | 8 | uimsbf |
|   frame_rate | 16 | uimsbf |
|   num_display_views | 10 | uimsbf |
|   num_decode_views | 10 | uimsbf |
|   average_bit_rate | 16 | |
|   maximum_bitrate | 16 | uimsbf |
|   temporal_id | 3 | uimsbf |
|   reserved_bit | 1 | bslbf |
|   operation_point_id | 10 | uimsbf |
|   op_dependent_flag | 1 | bslbf |
|   if (op_dependent_flag) | | |
|     dependent_operation_point_id | 10 | 10 |
|   for ( i = 0 ; i< num_decode_views; i++) { | | |
|     view_order_index | 10 | uimsbf |
|   } | | |
|   for ( i = 0 ; i< num_display_views; i++) { | | |
|     view_id | 10 | uimsbf |
|   } | | |
|   for ( i = 0 ; i < 6*(num_display_views + num_decode_views) % 8; i++) { | | |
|     reserved_bit | 1 | bslbf |
|   } | | |
| } | | |

As yet another alternative, source device 20 (FIG. 1) signal characteristics of an operation point using a data structure other than an operation point descriptor. For example, source device 20 may signal a rendering capability value that describes a rendering capability to be satisfied by a receiving device to use the MVC operation point, a decoding capability value that describes a decoding capability to be satisfied by the receiving device to use the MVC operation point, and a bitrate value that describes a bitrate of the MVC operation point using a modified MVC extension descriptor. Table 7 below illustrates an example of such a modified MVC extension descriptor.

TABLE 7

MVC extension descriptor

| Syntax | No. Of Bits | Mnemonic |
|---|---|---|
| MVC_extension_descriptor( ) { | | |
|   descriptor_tag | 8 | uimsbf |
|   descriptor_length | 8 | uimsbf |
|   frame_rate | 16 | uimsbf |
|   num_display_views | 16 | uimsbf |
|   num_decode_views | 10 | uimsbf |
|   for ( i = 0 ; i< num_display_views; i++) { | | |
|     view_id | 10 | uimsbf |
|   } | | |
|   average_bit_rate | 16 | uimsbf |
|   maximum_bitrate | 16 | uimsbf |
|   reserved | 4 | bslbf |
|   view_order_index_min | 10 | bslbf |
|   view_order_index_max | 10 | bslbf |
|   temporal_id_start | 3 | bslbf |
|   temporal_id_end | 3 | bslbf |
|   no_sei_nal_unit_present | 1 | bslbf |
|   reserved | 1 | bslbf |
| } | | |

Multiplexer 30 (FIG. 2) may construct MVC extension descriptors 110 according to the syntax defined by Table 7. In general, the semantics of the syntactic elements of Table 7 are the same as the commonly named elements described with respect to Table 1 above. The example of Table 7 includes additional elements over those of Table 1, namely a frame rate field, a number of display views field, a number of decode views field, and view identifier fields for each view of an operation point to which the MVC extension descriptor corresponds.

The frame rate field may comprise a sixteen bit field that indicates the maximum frame rate, in frame/256 seconds of the re-assembled AVC video stream. The number of display views field "num_display_views" may comprise a ten bit field that indicates the value of the number of the views, targeted for output, the re-assembled AVC video stream. The number of decode views field "num_decode_views" may comprise a ten bit field that indicates the value of the number of the views, required for decoding the re-assembled AVC video stream. Each of the view identifier fields "view_id" may comprise a ten bit field that indicates the value of the view_id of the NAL units for a corresponding view contained in the re-assembled AVC video bitstream.

In some examples, one or more operation point descriptors may include values that indicate a maximum temporal-identifier value and a maximum frame rate value of all the MVC operation points of a bitstream. In some examples, the maximum temporal-identifier value and the maximum frame rate value of all the MVC operation points of the bitstream may be signaled in an MVC operation point descriptor.

FIG. 7 is a conceptual diagram illustrating an example MVC prediction pattern. In the example of FIG. 7, eight views (having view IDs "S0" through "S7") are illustrated, and twelve temporal locations ("T0" through "T11") are illustrated for each view. That is, each row in FIG. 7 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Frames in FIG. 7 are indicated at the indication of each row and each column in FIG. 7 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multiview video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Table 8 below provides an example definition for an MVC extension sequence parameter set.

TABLE 8

| seq_parameter_set_mvc_extension( ) { | C | Descriptor |
| --- | --- | --- |
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1[ i ]; j++ ) | | |
|     non_anchor_ref_l1[ i ][ j ] | 0 | ue(v) |
| } | | |
| num_level_values_signalled_minus1 | 0 | ue(v) |
| for(i = 0; i<= num_level_values_signalled_minus1; i++) { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
|   } | | |
| } | | |
| } | | |

FIG. 7 provides various examples of inter-view prediction. Frames of view S1, in the example of FIG. 7, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 7, capital "B" and lowercase "b" are intended to indicate different hierarchical relationships between frames, rather than different encoding methodologies. In general, capital "B" frames are relatively higher in the prediction hierarchy than lowercase "b" frames. FIG. 7 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 7 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices is implied in the SPS MVC extension, as specified in Annex H of H.264/AVC (MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 7. Also, with respect to the example of FIG. 7, S0>S1, S2>S1, S2>S3, S4>S3, S4>S5, and S6>S5. Any decoding order for the views that does not violate these requirements is possible. Accordingly, many different decoding orders are possible, with only certain limitations. Two example decoding orders are presented below, although it should be understood that many other decoding orders are possible. In one example, illustrated in Table 9 below, views are decoded as soon as possible.

TABLE 9

| | View ID | | | | | | | |
|---|---|---|---|---|---|---|---|---|
| | S0 | S1 | S2 | S3 | S4 | S5 | S6 | S7 |
| View Order Index | 0 | 2 | 1 | 4 | 3 | 6 | 5 | 7 |

The example of Table 9 recognizes that view S1 may be decoded immediately after views S0 and S2 have been decoded view S3 may be decoded immediately after views S2 and S4 have been decoded, and view S5 may be decoded immediately after views S4 and S6 have been decoded.

Table 10 below provides another example decoding order in which the decoding order is such that any view that is used as a reference for another view is decoded before views that are not used as reference for any other view.

TABLE 10

| | View ID | | | | | | | |
|---|---|---|---|---|---|---|---|---|
| | S0 | S1 | S2 | S3 | S4 | S5 | S6 | S7 |
| View Order Index | 0 | 5 | 1 | 6 | 2 | 7 | 3 | 4 |

The example of Table 10 recognizes that frames of views S1, S3, S5, and S7 do not act as reference frames for frames of any other views, and therefore, views S1, S3, S5, and S7 may be decoded after frames of those views that are used as reference frames, that is, views S0, S2, S4, and S6, in the example of FIG. 7. Relative to each other, views S1, S3, S5, and S7 may be decoded in any order. Accordingly, in the example of Table 10, view S7 is decoded before each of views S1, S3, and S5.

To be clear, there may be a hierarchical relationship between frames of each view as well as the temporal locations of the frames of each view. With respect to the example of FIG. 7, frames at temporal location T0 are either intra-predicted or inter-view predicted from frames of other views at temporal location T0. Similarly, frames at temporal location T8 are either intra-predicted or inter-view predicted from frames of other views at temporal location T8. Accordingly, with respect to a temporal hierarchy, temporal locations T0 and T8 are at the top of the temporal hierarchy.

Frames at temporal location T4, in the example of FIG. 7, are lower in the temporal hierarchy than frames of temporal locations T0 and T8 because frames of temporal location T4 are B-encoded with reference to frames of temporal locations T0 and T8. Frames at temporal locations T2 and T6 are lower in the temporal hierarchy than frames at temporal location T4. Finally, frames at temporal locations T1, T3, T5, and T7 are lower in the temporal hierarchy than frames of temporal locations T2 and T6.

In MVC, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another other client may require view scalability and prefer views with view_id values S0, S2, and S4. If originally the view_ids are ordered respect to the example of Table 9, the view order index values are {0, 1, 2} and {0, 1, 4} in these two examples, respectively. Note both of these sub-bitstreams can be decoded as independent MVC bitstreams and can be supported simultaneously.

There can be many MVC sub-bitstreams that are decodable by MVC decoders. In theory, any combination of views that satisfies the following two properties can be decoded by an MVC decoder compliant to a certain profile or level: (1) the view components in each access unit are ordered in an increasing order of view order index, and (2) for each view in the combination, its dependent views are also included in the combination.

Figure 8:
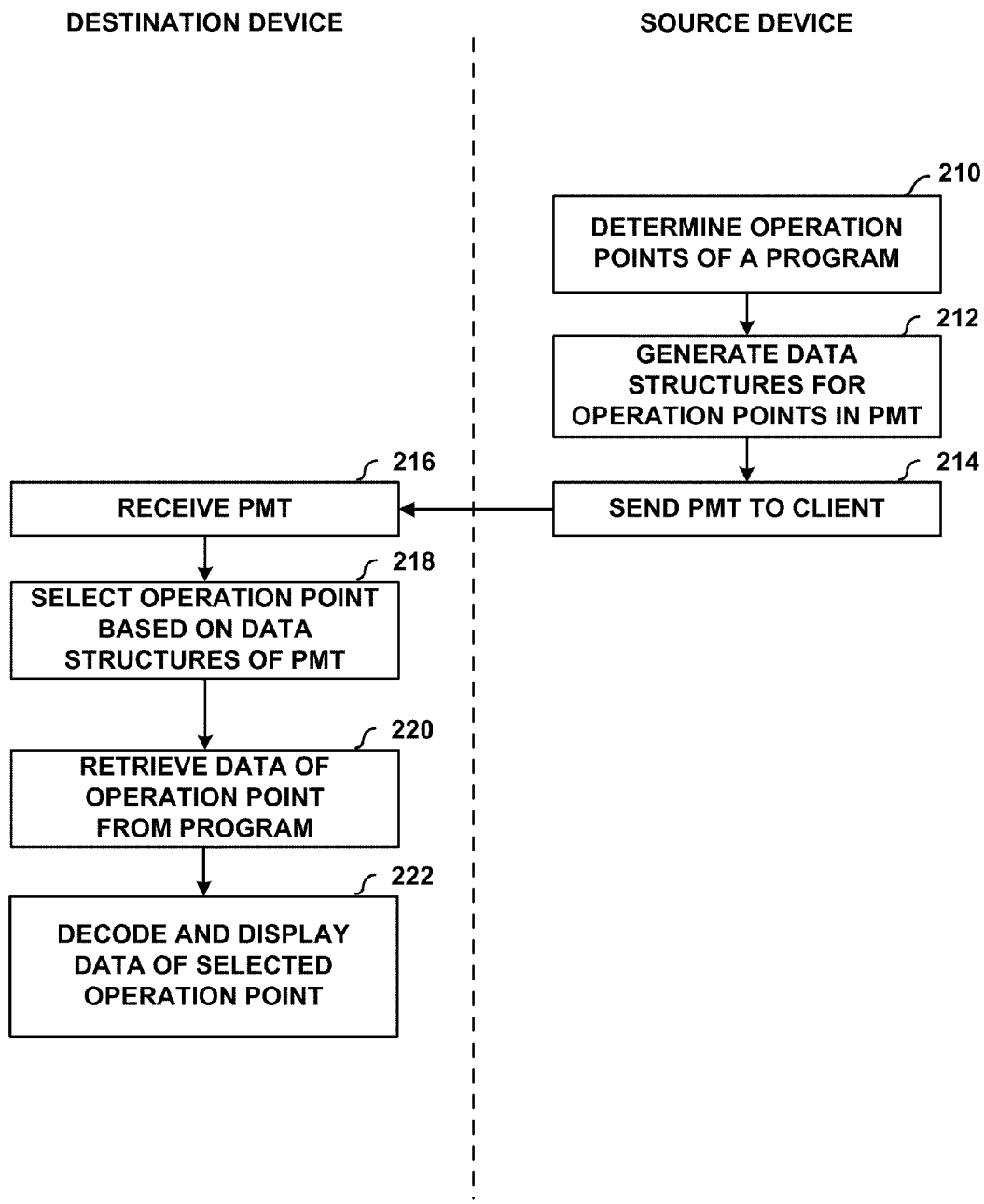
FIG. 8 is a flowchart illustrating an example method for using a data structure that signals characteristics of an operation point.

FIG. 8 is a flowchart illustrating an example method for using a data structure that signals characteristics of an operation point. That is, the method of FIG. 8 includes construction of data structures for each operation point of an MPEG-2

Systems bitstream by a source device, e.g., source device 20 (FIG. 1). The method of FIG. 8 also includes using received data structures to select an operation point from which to retrieve multimedia data to decode and display by a destination device, such as destination device 40 (FIG. 1).

Initially, in the example of FIG. 8, source device 20 determines operation points for a program (210). For example, source device 20 may select various subsets of views of a program to create various operation points that represent client devices having various capabilities, e.g., rendering and decoding capabilities. An administrator may interact with source device 20, for example, to select views and create operation points that represent client devices have varying rendering and decoding capabilities, or different operation points could be automatically created by source device 20.

After determining the operation points for a program, source device 20 may generate data structures for each of the operation points in a program map table (212), e.g., when the bitstream will be broadcast as an MPEG-2 Systems transport stream. Alternatively, source device 20 may generate the data structures in a program stream map when the bitstream will be broadcast as an MPEG-2 Systems program stream. In any case, source device 20 may generate, for each operation point, a data structure that represents characteristics of the corresponding operation point. The data structure may comprise an operation point descriptor corresponding to one of the examples of FIGS. 4-6, for example. In this manner, the data structure may signal rendering characteristics, decoding characteristics, and a bitrate for the corresponding operation point.

Source device 20 may then output the data structures (214), e.g., within the PMT in the example of FIG. 8, to a client device, e.g., destination device 40 (FIG. 1). In this manner, source device 20 may output the data structures as part of the bitstream. Source device 20 may output the bitstream in the form of a broadcast, unicast, multicast, anycast, or other communication protocol over a network, e.g., over a wireless or wired network, or broadcast over television frequencies, e.g., according to signals conforming to Advanced Television Systems Committee (ATSC) standards or National Television System Committee (NTSC) standards. Alternatively, source device 20 may encode the bitstream into a computer readable storage medium, such as a DVD-ROM, Blu-ray disc, flash drive, magnetic disk, or other storage medium, in which case source device 20 may form a PSM that includes the data structures for the operation points and encode the PSM into the computer readable storage medium.

Destination device 40 may ultimately receive the PMT (or PSM) from source device 20 (216). Destination device 40 may then select one of the operation points based on characteristics of the operation points signaled by the data structures included in the PMT or PSM (218). In general, destination device 40 may select an operation point for which destination device 40 satisfies the rendering and decoding capabilities signaled by the corresponding data structure. For example, destination device 40 may determine whether video output 44 is capable of rendering a number of views indicated by the data structure as the number of views to be displayed, at a frame rate in conformance with the rendering capabilities value signaled by the data structure for the operation point. Likewise, destination device 40 may determine whether video decoder 48 is capable of decoding a number of views to be decoded for the operation point as signaled by the decoding capabilities value data structure of the operation point. Moreover, in some examples, destination device 40 may use the bitrate signaled in the data structure to select an operation point that is suitable for a transport medium, e.g., based on bandwidth limitations of the transport medium from which destination device 40 receives the bitstream.

When destination device 40 determines that destination device 40 is capable of rendering and decoding more than one operation point, destination device 40 may select a highest quality operation point for decoding and rendering. For example, destination device 40 may select an operation point having the highest number of views, the highest bitrate, the highest frame rate, or other indications of quality for an operation point to determine which operation point to select.

After selecting an operation point, destination device 40 may retrieve data for the operation point from the bitstream (220). That is, destination device 40 may extract data for each of the views corresponding to the operation point from the program included in the bitstream. In some examples, destination device 40 selects data from one or more sub-bitstreams of the bitstream to extract data for the operation point. After extracting the data, destination device may decode and display the data for the selected operation point (222). Video decoder 48 may decode each of the views that are to be decoded for the operation point, while video output 44 may display each of the views that are to be displayed for the operation point. The displayed views may not necessarily be the views that are decoded, as described above.

In one or more examples, the functions described may be implemented in hardware, software, firmware, or any combination thereof. If implemented in software, the functions may be stored on or transmitted over as one or more instructions or code on a computer-readable medium. Computer-readable media may include computer-readable storage media such as data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that a computer-readable storage medium and a data storage medium does not include connections, carrier waves, signals, or other transient media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
constructing, with a source device, one or more operation point descriptors each corresponding to respective multiview video coding (MVC) operation points of an MPEG-2 (Motion Picture Experts Group) System standard bitstream, wherein each operation point descriptor is separate from network abstraction layer (NAL) units included in the MPEG-2 System standard bitstream, wherein each operation point descriptor signals a rendering capability value that describes a rendering capability to be satisfied by a receiving device to use the MVC operation point and a decoding capability value that describes a decoding capability to be satisfied by the receiving device to use the MVC operation point, wherein each operation point descriptor is included as part of the bitstream, and wherein constructing each operation point descriptor comprises:
including a temporal-identifier value in the operation point descriptor that corresponds to a frame rate for a video stream assembled from the video data of the views for the MVC operation point;
including values in the operation point descriptor representative of views targeted for rendering of the MVC operation point; and
including values in the operation point descriptor representative of views to be decoded for the MVC operation point; and
outputting the bitstream comprising the operation point descriptors that correspond to the respective MVC operation points.

2. The method of claim 1, wherein constructing the operation point descriptors comprises constructing each operation point descriptor to cause one or more two-dimensional display devices and three-dimensional display devices to adapt the bitstream to the one or more two-dimensional display devices and three-dimensional display devices and to accommodate transport media of various bandwidths to the one or more two-dimensional display devices and three-dimensional display devices.

3. The method of claim 1, wherein the rendering capability value describes at least a number of views targeted for rendering for the corresponding MVC operation point, a frame rate for video data of the corresponding MVC operation point, and a temporal identifier value for the corresponding MVC operation point.

4. The method of claim 1, wherein the decoding capability value describes at least a number of views to be decoded for the corresponding MVC operation point, a level value corresponding to the MVC operation point, and a profile value corresponding to the MVC operation point.

5. The method of claim 1, wherein constructing the operation point descriptors comprises constructing the operation point descriptors to signal a bitrate value that describes a bitrate of the corresponding MVC operation point, and wherein the bitrate value describes one of an average bitrate for the corresponding MVC operation point and the maximum bitrate for the corresponding MVC operation point.

6. The method of claim 1, wherein constructing the operation point descriptors comprises constructing an operation point descriptor in a program map table data structure, and wherein the bitstream comprises an MPEG-2 transport stream.

7. The method of claim 1, wherein constructing the operation point descriptors comprises constructing an operation point descriptor in a program stream map data structure, and wherein the bitstream comprises an MPEG-2 program stream.

8. An apparatus comprising:
a multiplexer that constructs one or more operation point descriptors each corresponding to respective multiview video coding (MVC) operation points of an MPEG-2 (Motion Picture Experts Group) System standard bitstream, wherein each operation point descriptor is separate from network abstraction layer (NAL) units included in the MPEG-2 System standard bitstream, wherein each operation point descriptor signals a rendering capability value that describes a rendering capability to be satisfied by a receiving device to use the MVC operation point and a decoding capability value that describes a decoding capability to be satisfied by the receiving device to use the MVC operation point, wherein each operation point descriptor is included as part of the bitstream, wherein each of the MVC operation points corresponds to a respective subset of views of the bitstream, and wherein to construct each operation point descriptor, the multiplexer includes:
a temporal-identifier value in the operation point descriptor that corresponds to a frame rate for a video stream assembled from the video data of the views for the MVC operation point,
values in the operation point descriptor representative of views targeted for rendering of the MVC operation point, and
values in the operation point descriptor representative of views to be decoded for the MVC operation point; and
an output interface that outputs the bitstream comprising the operation point descriptors that correspond to the respective MVC operation points.

9. The apparatus of claim 8, wherein the rendering capability value describes at least a number of views targeted for rendering for the corresponding MVC operation point, a frame rate for video data of the corresponding MVC operation point, and a temporal identifier value for the corresponding MVC operation point.

10. The apparatus of claim 8, wherein the decoding capability value describes at least a number of views to be decoded for the corresponding MVC operation point, a level value corresponding to the MVC operation point, and a profile value corresponding to the MVC operation point.

11. The apparatus of claim 8, wherein the bitrate value describes one of an average bitrate for the corresponding MVC operation point and the maximum bitrate for the corresponding MVC operation point.

12. The apparatus of claim 8, wherein the multiplexer constructs each operation point descriptor as an operation point descriptor in a program map table data structure, and wherein the bitstream comprises an MPEG-2 transport stream.

13. The apparatus of claim 8, wherein the multiplexer constructs each operation point descriptor as an operation point descriptor in a program stream map data structure, and wherein the bitstream comprises an MPEG-2 program stream.

14. The apparatus of claim 8, wherein the apparatus comprises at least one of:
an integrated circuit;
a microprocessor, and
a wireless communication device that includes the multiplexer.

15. An apparatus comprising:
means for constructing one or more operation point descriptors each corresponding to respective multiview video coding (MVC) operation points of an MPEG-2 (Motion Picture Experts Group) System standard bitstream, wherein each operation point descriptor is separate from network abstraction layer (NAL) units included in the MPEG-2 System standard bitstream, wherein each operation point descriptor signals a rendering capability value that describes a rendering capability to be satisfied by a receiving device to use the MVC operation point and a decoding capability value that describes a decoding capability to be satisfied by the receiving device to use the MVC operation point, wherein each operation point descriptor is included as part of the bitstream, and wherein the means for constructing the operation point descriptors comprises:
means for including a temporal-identifier value in the operation point descriptor that corresponds to a frame rate for a video stream assembled from the video data of the views for the MVC operation point,
means for including values in the operation point descriptor representative of views targeted for rendering of the MVC operation point, and
means for including values in the operation point descriptor representative of views to be decoded for the MVC operation point, and
means for outputting the bitstream comprising the operation point descriptors that correspond to the respective MVC operation points.

16. The apparatus of claim 15, wherein the rendering capability value describes at least a number of views targeted for rendering for the corresponding MVC operation point, a frame rate for video data of the corresponding MVC operation point, and a temporal identifier value for the corresponding MVC operation point.

17. The apparatus of claim 15, wherein the decoding capability value describes at least a number of views to be decoded for the corresponding MVC operation point, a level value corresponding to the MVC operation point, and a profile value corresponding to the MVC operation point.

18. The apparatus of claim 15, wherein the bitrate value describes one of an average bitrate for the corresponding MVC operation point and the maximum bitrate for the corresponding MVC operation point.

19. A non-transitory computer-readable storage medium having stored thereon instructions that, when executed, cause a processor of a source device to:
construct one or more operation point descriptors each corresponding to respective MVC operation points of an MPEG-2 (Motion Picture Experts Group) System standard bitstream, wherein each operation point descriptor is separate from network abstraction layer (NAL) units included in the MPEG-2 System standard bitstream, wherein each operation point descriptor signals a rendering capability value that describes a rendering capability to be satisfied by a receiving device to use the MVC operation point and a decoding capability value that describes a decoding capability to be satisfied by the receiving device to use the MVC operation point, wherein each operation point descriptor is included as part of the bitstream, and wherein the instructions that cause the processor to construct each operation point descriptor comprise instructions that cause the processor to include:
a temporal-identifier value in the operation point descriptor that corresponds to a frame rate for a video stream assembled from the video data of the views for the MVC operation point,
values in the operation point descriptor representative of views targeted for rendering of the MVC operation point, and
values in the operation point descriptor representative of views to be decoded for the MVC operation point; and
cause an output interface to output the bitstream comprising the operation point descriptors that correspond to the respective MVC operation points.

20. The computer-readable storage medium of claim 19, wherein the rendering capability value describes at least a number of views targeted for rendering for the corresponding MVC operation point, a frame rate for video data of the corresponding MVC operation point, and a temporal identifier value for the corresponding MVC operation point.

21. The computer-readable storage medium of claim 19, wherein the decoding capability value describes at least a number of views to be decoded for the corresponding MVC operation point, a level value corresponding to the MVC operation point, and a profile value corresponding to the MVC operation point.

22. The computer-readable storage medium of claim 19, wherein the bitrate value describes one of an average bitrate for the corresponding MVC operation point and the maximum bitrate for the corresponding MVC operation point.

23. A method comprising:
receiving, with a destination device, one or more operation point descriptors corresponding to respective multiview video coding (MVC) operation points of an MPEG-2 (Motion Picture Experts Group) System standard bitstream, wherein each operation point descriptor is separate from network abstraction layer (NAL) units included in the MPEG-2 System standard bitstream, wherein each of the operation point descriptors signals a rendering capability value that describes a rendering capability to be satisfied by a receiving device to use the MVC operation point and a decoding capability value that describes a decoding capability to be satisfied by the receiving device to use the MVC operation point;
determining, for each of the operation point descriptors that correspond to the respective MVC operation points, whether a video decoder of the destination device is capable of decoding a number of views corresponding to the MVC operation point based on the decoding capability signaled by the operation point descriptor, wherein each of the operation point descriptors comprises:

values representative of views targeted for rendering of the MVC operation point and values representative of views to be decoded for the MVC operation point;

determining, for each of the operation point descriptors that correspond to the respective MVC operation points, whether the destination device is capable of rendering the views corresponding to the MVC operation point based on the rendering capability signaled by the operation point descriptor;

selecting one of the operation points based on the corresponding operation point descriptor, wherein selecting comprises determining that the destination device is capable of decoding and rendering the views corresponding to the selected operation point; and sending the views corresponding to the selected MVC operation point to the video decoder of the destination device.

24. The method of claim 23, wherein determining whether the video decoder is capable of decoding the views comprises determining whether the video decoder is capable of decoding a number of views equivalent to the decode-number-of-views value at the frame rate indicated by the frame rate value.

25. The method of claim 23, wherein the destination device is configured with a maximum view render value that describes a maximum number of views that can be rendered by the destination device and a maximum frame rate value that describes a maximum frame rate of video data that can be displayed by the destination device, wherein determining whether the destination device is capable of rendering the views corresponding to the MVC operation point comprises:

comparing a number of views corresponding to the MVC operation point to the maximum view render value; and comparing a frame rate of the views corresponding to the MVC operation point to the maximum frame rate value, wherein sending the views corresponding to the MVC operation point to the video decoder comprises sending the views corresponding to the MVC operation point to the video decoder when the number of views corresponding to the MVC operation point is less than or equal to the maximum view render value and when the frame rate of the views corresponding to the MVC operation point is less than or equal to the maximum frame rate value.

26. The method of claim 25, wherein the maximum view render value is inversely proportional to the maximum frame rate value.

27. An apparatus comprising:

an input interface configured to receive one or more operation point descriptor descriptors corresponding to respective multiview video coding(MVC) operation points of an MPEG-2 (Motion Picture Experts Group) System standard bitstream, wherein each operation point descriptor is separate from network abstraction layer (NAL) units included in the MPEG-2 System standard bitstream, wherein each of the operation point descriptors signals a rendering capability value that describes a rendering capability to be satisfied by a receiving device to use the MVC operation point and a decoding capability value that describes a decoding capability to be satisfied by the receiving device to use the MVC operation point, wherein each of the operation point descriptors comprises: values representative of views targeted for rendering of the MVC operation point and values representative of views to be decoded for the MVC operation point;

a video decoder configured to decode video data; and a demultiplexer configured to determine, for each of the operation point descriptors that correspond to the respective MVC operation points, whether the video decoder is capable of decoding a number of views corresponding to the MVC operation point based on the decoding capability signaled by the operation point descriptor, to determine, for each of the operation point descriptors that correspond to the respective MVC operation points, whether the apparatus is capable of rendering the views corresponding to the MVC operation point based on the rendering capability signaled by the operation point descriptor, to select one of the operation points based on the corresponding operation point descriptor, wherein to select one of the operation points, the demultiplexer is configured to determine whether the apparatus is capable of decoding and rendering the views corresponding to the selected operation point, and to send the views corresponding to the selected MVC operation point to the video decoder.

28. The apparatus of claim 27, wherein to determine whether the video decoder is capable of decoding the views, the demultiplexer is configured to determine whether the video decoder is capable of decoding a number of views equivalent to the decode-number-of-views value at the frame rate indicated by the frame rate value.

29. The apparatus of claim 27, wherein the demultiplexer is configured to receive operation point descriptors for each operation point included in the bitstream, select an operation point based on the corresponding operation point descriptor, wherein to select the MVC operation point, the demultiplexer is configured to determine that the video decoder is capable of decoding and rendering views corresponding to the selected operation point, and to send the views corresponding to the selected operation point to the video decoder.

30. The apparatus of claim 27, further comprising a computer-readable storage medium configured to store a maximum view render value that describes a maximum number of views that can be rendered by the destination device, and a maximum frame rate value that describes a maximum frame rate of video data that can be displayed by the destination device, wherein to determine whether the apparatus is capable of rendering the views corresponding to the MVC operation point, the demultiplexer is configured to compare a number of views corresponding to the MVC operation point to the maximum view render value, and to compare a frame rate of the views corresponding to the MVC operation point to the maximum frame rate value, and wherein the demultiplexer is configured to send the views corresponding to the MVC operation point to the video decoder when the number of views corresponding to the MVC operation point is less than or equal to the maximum view render value and when the frame rate of the views corresponding to the MVC operation point is less than or equal to the maximum frame rate value.

31. The apparatus of claim 30, wherein the maximum view render value is inversely proportional to the maximum frame rate value.

32. The apparatus of claim 27, wherein the apparatus comprises at least one of:

an integrated circuit;

a microprocessor, and a wireless communication device that includes the demultiplexer.

33. An apparatus comprising:

means for receiving one or more operation point descriptors corresponding to respective multiview video coding (MVC) operation points of an MPEG-2 (Motion Picture Experts Group) System standard bitstream, wherein each operation point descriptor is separate from network abstraction layer (NAL) units included in the MPEG-2 System standard bitstream, wherein each of the operation point descriptors signals a rendering capability value that describes a rendering capability to be satisfied by a receiving device to use the MVC operation point and a decoding capability value that describes a decoding capability to be satisfied by the receiving device to use the MVC operation point;

means for determining, for each of the operation point descriptors that correspond to the respective MVC operation points, whether a video decoder of the apparatus is capable of decoding views corresponding to the MVC operation point based on the decoding capability signaled by the operation point descriptor, wherein each of the operation point descriptors comprises values representative of views targeted for rendering of the MVC operation point and values representative of views to be decoded for the MVC operation point;

means for determining, for each of the operation point descriptors that correspond to the respective MVC operation points, whether the apparatus is capable of rendering the views corresponding to the MVC operation point based on the rendering capability signaled by the operation point descriptor;

means for selecting one of the operation points based on the corresponding operation point descriptor, wherein the means for selecting comprises means for determining that the video decoder is capable of decoding and rendering the views corresponding to the selected operation point; and means for sending the views corresponding to the selected MVC operation point to the video decoder of the apparatus.

34. The apparatus of claim 33, wherein the means for determining whether the video decoder is capable of decoding the views comprises means for determining whether the video decoder is capable of decoding a number of views equivalent to the decode-number-of-views value at the frame rate indicated by the frame rate value.

35. The apparatus of claim 33, further comprising:
means for receiving operation point descriptors for each operation point included in the bitstream;
means for selecting an operation point based on the corresponding operation point descriptor, wherein selecting comprises determining that the video decoder is capable of decoding and rendering views corresponding to the selected operation point; and
means for sending the views corresponding to the selected operation point to the video decoder.

36. The apparatus of claim 33, further comprising means for storing a maximum view render value that describes a maximum number of views that can be rendered by the destination device and a maximum frame rate value that describes a maximum frame rate of video data that can be displayed by the destination device, wherein the means for determining whether the destination device is capable of rendering the views corresponding to the MVC operation point comprises:
means for comparing a number of views corresponding to the MVC operation point to the maximum view render value; and
means for comparing a frame rate of the views corresponding to the MVC operation point to the maximum frame rate value, wherein the means for sending the views corresponding to the MVC operation point to the video decoder comprises means for sending the views corresponding to the MVC operation point to the video decoder when the number of views corresponding to the MVC operation point is less than or equal to the maximum view render value and when the frame rate of the views corresponding to the MVC operation point is less than or equal to the maximum frame rate value.

37. A non-transitory computer-readable storage medium having stored thereon instructions that when executed, cause a processor of a destination device to:
receive one or more operation point descriptors corresponding to respective MVC operation points of an MPEG-2 (Motion Picture Experts Group) System standard bitstream, wherein each operation point descriptor is separate from network abstraction layer (NAL) units included in the MPEG-2 System standard bitstream, wherein each of the operation point descriptors signals a rendering capability value that describes a rendering capability to be satisfied by a receiving device to use the MVC operation point and a decoding capability value that describes a decoding capability to be satisfied by the receiving device to use the MVC operation point;
determine, for each of the operation point descriptors that correspond to the respective MVC operation points, whether a video decoder of the destination device is capable of decoding a number of views corresponding to the MVC operation point based on the decoding capability signaled by the operation point descriptor,
wherein each of the operation point descriptors comprises:
values representative of views targeted for rendering of the MVC operation point and values representative of views to be decoded for the MVC operation point;
determine, for each of the operation point descriptors that correspond to the respective MVC operation points, whether the destination device is capable of rendering the views corresponding to the MVC operation point based on the rendering capability signaled by the operation point descriptor;
select one of the operation points based on the corresponding operation point descriptor, wherein selecting comprises determining that the video decoder is capable of decoding and rendering the views corresponding to the selected operation point; and
send the views corresponding to the selected MVC operation point to the video decoder of the destination device.

38. The computer-readable storage medium of claim 37, wherein the instructions that cause the processor to determine whether the video decoder is capable of decoding the views comprise instructions that cause the processor to determine whether the video decoder is capable of decoding a number of views equivalent to the decode-number-of-views value at the frame rate indicated by the frame rate value.

39. The computer-readable storage medium of claim 37, further comprising instructions that cause the processor to:
receive operation point descriptors for each operation point included in the bitstream;
select an operation point based on the corresponding operation point descriptor, wherein selecting comprises determining that the video decoder is capable of decoding and rendering views corresponding to the selected operation point; and
send the views corresponding to the selected operation point to the video decoder.

40. The computer-readable storage medium of claim 37, wherein the destination device is configured with a maximum view render value that describes a maximum number of views that can be rendered by the destination device and a maximum frame rate value that describes a maximum frame rate of video data that can be displayed by the destination device, wherein the instructions that cause the processor to determine whether the destination device is capable of rendering the views corresponding to the MVC operation point comprise instructions that cause the processor to:

compare a number of views corresponding to the MVC operation point to the maximum view render value; and compare a frame rate of the views corresponding to the MVC operation point to the maximum frame rate value, wherein the instructions that cause the processor to send the views corresponding to the MVC operation point to the video decoder comprise instructions that cause the processor to send the views corresponding to the MVC operation point to the video decoder when the number of views corresponding to the MVC operation point is less than or equal to the maximum view render value and when the frame rate of the views corresponding to the MVC operation point is less than or equal to the maximum frame rate value.

\* \* \* \* \*